United States Patent
Sakurazawa et al.

(10) Patent No.: US 8,293,341 B2
(45) Date of Patent: *Oct. 23, 2012

(54) CELLULOSE ESTER FILM, RETARDATION FILM, POLARIZING PLATE AND LIQUID CRYSTAL DISPLAY DEVICE

(75) Inventors: Mamoru Sakurazawa, Minami-Ashigara (JP); Yasuo Mukunoki, Minami-Ashigara (JP); Akihiro Matsufuji, Minami-Ashigara (JP); Hiroaki Sata, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 599 days.

This patent is subject to a terminal disclaimer.

(21) Appl. No.: 12/466,958

(22) Filed: May 15, 2009

(65) Prior Publication Data

US 2009/0286016 A1   Nov. 19, 2009

(30) Foreign Application Priority Data

May 15, 2008 (JP) .................................. 2008-128764
Mar. 18, 2009 (JP) .................................. 2009-066666

(51) Int. Cl.
*C09K 19/00* (2006.01)
*C09K 19/12* (2006.01)
*C09K 19/20* (2006.01)
*C09K 19/22* (2006.01)
*G02F 1/1335* (2006.01)
*G02F 1/1333* (2006.01)

(52) U.S. Cl. ............. 428/1.3; 349/96; 349/98; 349/141; 349/117; 349/122; 349/123; 349/130; 252/299.66; 252/299.67; 252/299.68; 428/906

(58) Field of Classification Search .................... None
See application file for complete search history.

(56) References Cited

U.S. PATENT DOCUMENTS

| | | | | |
|---|---|---|---|---|
| 2,815,354 | A * | 12/1957 | Field et al. ..................... | 554/164 |
| 5,559,171 | A | 9/1996 | Buchanan et al. | |
| 2002/0041352 | A1* | 4/2002 | Kuzuhara et al. ............. | 349/117 |
| 2006/0045992 | A1 | 3/2006 | Michihata et al. | |
| 2006/0093759 | A1* | 5/2006 | Fukagawa ..................... | 428/1.31 |
| 2006/0257591 | A1 | 11/2006 | Takagi et al. | |

FOREIGN PATENT DOCUMENTS

JP   2006-64803 A   3/2006
JP   2007-3767 A    1/2007

* cited by examiner

*Primary Examiner* — David Sample
*Assistant Examiner* — Nicole Gugliotta
(74) *Attorney, Agent, or Firm* — Buchanan Ingersoll & Rooney PC

(57) ABSTRACT

Provided is a cellulose ester film including a polycondensed ester which is obtained from a mixture containing an aromatic dicarboxylic acid, an aliphatic dicarboxylic acid, an aliphatic diol having an average carbon atom number of from 2.0 to 3.0 and a monocarboxylic acid, and both terminals of which are a monocarboxylic acid ester derivative.

9 Claims, No Drawings

CELLULOSE ESTER FILM, RETARDATION FILM, POLARIZING PLATE AND LIQUID CRYSTAL DISPLAY DEVICE

BACKGROUND OF THE INVENTION

1. Field of the Invention

The present invention relates to a cellulose ester film, a retardation film, a polarizing plate and a liquid crystal display device.

2. Description of the Related Art

In silver halide photographic materials, retardation films, polarizing plates and image display devices, films of polymers represented by cellulose esters, polyesters, polycarbonates, cycloolefin polymers, vinyl polymers and polyimides and so on are used. Since films which are more excellent from the standpoints of planarity and uniformity can be manufactured from these polymers, they are widely employed as a film for optical applications. For example, cellulose ester films having adequate water vapor permeability can be stuck directly with a polarizer composed of the most general polyvinyl alcohol (PVA)/iodine through online. For that reason, cellulose esters, especially cellulose acetate, are widely employed as a protective film of polarizing plate.

In the case where a transparent polymer film is used for optical applications such as a retardation film, a support of retardation film, a protective film of polarizing plate and a liquid crystal display device, it is a very important factor to control the optical anisotropy in determining the performance of a display device (for example, visibility).

On the other hand, a solution fabrication process is widely utilized as a method for manufacturing a cellulose ester film to be used for optical applications. In that case, for the purpose of imparting high-speed fabrication adaptability during the manufacture, it is preferred to add a plasticizer. This is because by adding a plasticizer, it is possible to volatilize the solvent within a short period of time during drying at the time of solution fabrication. However, in a transparent polymer film containing a plasticizer which is usually used, there is, for example, the case where, when the polymer film is treated at a high temperature in a drying step, etc., smoking is generated; failures in operations are caused due to the attachment of a volatilized oil or the like to a manufacturing machine; or area defects are generated due to the attachment of stains to the polymer film. For that reason, there were naturally restrictions in the manufacture condition or treatment condition relative to the transparent polymer film using a plasticizer.

There is disclosed a technology of adding, as a polymeric plasticizer, a polyester and a polyester ether each having a mass average molecular weight of from 400 to 5,000 (see, for example, JP-A-2007-3767). According to this technology, though it is described that the technology is excellent in prevention of raw material deposition, water vapor permeability and dimension, it was insufficient in process contamination at the time of manufacture and raw material volatilization properties at the time of a stretching treatment. Furthermore, there is disclosed a cellulose ester film containing a polyester having an aromatic ring (see, for example, JP-A-2006-064803 and U.S. Pat. No. 5,559,171). However, even such a compound was not satisfactory from the standpoints of failures of operations of manufacturing equipment due to volatilization of the foregoing plasticizer, generation of area defects of film and performance with time in a form of polarizing plate.

On the other hand, in liquid crystal display devices, the use of an optically compensatory film for the purposes of enlarging a viewing angle, improving image coloration and enhancing the contrast is a widely known technology. In a most diffused VA (vertically aligned) mode or TN mode or the like, optically compensatory films capable of controlling particularly optical characteristics (for example, an Re value and an Rth value) to desired values are being demanded.

For the adjustment of optical characteristics suitable for the VA mode, the stretching treatment is required. A countermeasure against area defects to be caused due to the process contamination at the time of manufacture was strongly demanded.

SUMMARY OF THE INVENTION

An object of the invention is to provide an excellent cellulose ester film which is low in process contamination at the time of manufacture and high in production efficiency.

Another object of the invention is to provide a retardation film using the foregoing cellulose ester film, which has satisfactory surface properties and which is able to control an Re value and an Rth value to desired values, and a polarizing plate which has small changes in performance with time.

A further object of the invention is to provide a liquid crystal display device using the foregoing polarizing plate, which has satisfactory display quality.

The present inventors made extensive and intensive investigations. As a result, it has been found that the foregoing problems can be solved by the following configurations.

(1) A cellulose ester film comprising a polycondensed ester which is obtained from a mixture containing an aromatic dicarboxylic acid, an aliphatic dicarboxylic acid, an aliphatic diol having an average carbon atom number of from 2.0 to 3.0 and a monocarboxylic acid, and both terminals of which are a monocarboxylic acid ester derivative.

(2) The cellulose ester film as set forth above in (1), wherein the both terminals of the polycondensed ester are an aliphatic monocarboxylic acid ester derivative.

(3) The cellulose ester film as set forth above in (1) or (2), wherein the polycondensed ester has a number average molecular weight of from 700 to 2,000.

(4) The cellulose ester film as set forth above in any one of (1) to (3), wherein the cellulose ester film is stretched in a stretch ratio of from 5% to 100% in a direction vertical to a conveyance direction.

(5) The cellulose ester film as set forth above in (4), wherein the stretching is carried out under a condition that a residual solvent amount of the cellulose ester film is not more than 5%, wherein the residual solvent amount is defined as follows:

(Residual solvent amount)=[(Mass of residual volatile component)/(Mass of film after heat treatment)]× 100%.

(6) The cellulose ester film as set forth above in any one of (1) to (5), comprising a compound having at least two aromatic rings.

(7) The cellulose ester film as set forth above in any one of (1) to (6), comprising a cellulose acylate which has a degree of acyl substitution of from 2.00 to 2.95 and a viscosity average degree of polymerization of from 180 to 700.

(8) A retardation film comprising the cellulose ester film as set forth above in any one of (1) to (7).

(9) A polarizing plate comprising a polarizer; and protective films on both sides of the polarizer, wherein at least one of the protective films is the cellulose ester film as set forth above in any one of (1) to (7) or the retardation film as set forth above in (8).

(10) A liquid crystal display device comprising a liquid crystal cell; and polarizing plates on both sides of the liquid crystal cell, wherein at least one of the polarizing plates is the polarizing plate as set forth above in (9).

DETAILED DESCRIPTION OF THE INVENTION

The invention is hereunder described in detail. Incidentally, in the present specification, when representing a property value, a characteristic value, or so, the expression "from A to B" means "A or more and not more than B" (the numerals A and B are included as the lower limit and the upper limit).

The cellulose ester film of the invention contains a polycondensed ester which is obtained from a mixture containing an aromatic dicarboxylic acid, an aliphatic dicarboxylic acid, an aliphatic diol having an average carbon atom number of 2.0 or more and not more than 3.0 and a monocarboxylic acid, both terminals of which are composed of a monocarboxylic acid ester derivative.

[Polycondensed Ester]

The polycondensed ester according to the invention can be obtained from, as a raw material, a mixture containing at least one aromatic dicarboxylic acid (aromatic ring-containing dicarboxylic acid), at least one aliphatic dicarboxylic acid, at least one aliphatic diol having an average carbon atom number of 2.0 or more and not more than 3.0 and at least one monocarboxylic acid.

The average carbon atom number of the aliphatic diol is a value calculated by multiplying a composition ratio (molar fraction) of the aliphatic diol by the constitutional carbon atom number. For example, when the aliphatic diol consists of 50% by mole of ethylene glycol and 50% by mole of 1,2-propanediol, the average carbon atom number is 2.5.

A number average molecular weight of the polycondensed ester is preferably from 700 to 2,000, more preferably from 700 to 1,500, and further preferably from 700 to 1,200. The number average molecular weight of the polycondensed ester of the invention can be measured and evaluated by means of gel permeation chromatography.

As to a ratio of the aromatic dicarboxylic acid and the aliphatic dicarboxylic acid according to the invention, the amount of the aromatic dicarboxylic acid is preferably from 5 to 70% by mole relative to the total amount of the dicarboxylic acids. When the amount of the aromatic dicarboxylic acid is less than 5% by mole, the polarizing plate is large in changes in performance and insufficient, and after a lapse of time, water permeability of the film is lowered. When the amount of the aromatic dicarboxylic acid exceeds 70% by mole, the affinity with the cellulose ester is lowered so that bleedout is easy to generate during the fabrication process, and hence, such is not preferable.

The amount of the aromatic dicarboxylic acid in the dicarboxylic acids constituting the polycondensed ester of the invention is more preferably from 10 to 60% by mole, and further preferably from 20 to 50% by mole.

In the aliphatic diol, the amount of ethylene glycol is preferably 50% by mole, and more preferably 75% by mole.

As the aromatic dicarboxylic acid, phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, 2,6-naphthalenedicarboxylic acid and the like are preferably used. Of these, phthalic acid and terephthalic acid are more preferable. Also, the aromatic dicarboxylic acid may be used singly or in combinations of two or more kinds thereof. In the case where two kinds of the aromatic dicarboxylic acid are used, it is preferred to use phthalic acid and terephthalic acid.

Examples of the aliphatic dicarboxylic acid which is suitably used in the invention include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid. Of these, succinic acid and adipic acid are preferable. Also, the aliphatic dicarboxylic acid may be used singly or in combinations of two or more kinds thereof. In the case where two kinds of the aliphatic dicarboxylic acid are used, it is preferred to use succinic acid and adipic acid.

The diol which forms the polycondensed ester is an aliphatic diol having an average carbon atom number of 2.0 or more and not more than 3.0. When the average carbon atom number of the aliphatic diol is more than 3.0, a loss on heating of the compound increases, and area defects which are considered to be caused due to process contamination at the time of drying a cellulose acylate web are generated. Also, when the average carbon atom number of the aliphatic diol is less than 2.0, the synthesis is difficult, and hence, such is not employable.

Examples of the aliphatic diol include alkyl diols and alicyclic diols, for example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-diemethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol, etc. It is preferred to use, as a mixture, one kind or two or more kinds of these aliphatic glycols together with ethylene glycol.

Of these aliphatic diols, ethylene glycol, 1,2propanediol and 1,3-propanediol are preferable; and ethylene glycol and 1,2-propanediol are especially preferable.

The both terminals of the polycondensed ester of the invention are sealed upon reacting with a monocarboxylic acid. At that time, the both terminals of the polycondensed ester are a monocarboxylic acid ester derivative, and preferably an aliphatic monocarboxylic acid ester derivative. That is, as the monocarboxylic acid which is used for sealing, aliphatic monocarboxylic acids are suitable. Of these, acetic acid, propionic acid, butanoic acid, benzoic acid and derivatives thereof are preferable; acetic acid and propionic acid are more preferable; and acetic acid is the most preferable. When the carbon atom number of the monocarboxylic acid which is used for the both terminals of the polycondensed ester is not more than 3, the loss on heating of the compound does not become large, and it is possible to reduce the generation of area defects.

Two or more kinds of the monocarboxylic acid which is used for sealing may be mixed.

It is preferable that the both terminals of the polycondensed ester of the invention are sealed with acetic acid or propionic acid; and it is the most preferable that the both terminals are an acetyl ester residue structure by sealing with acetic acid.

(Specific Examples of Polycondensed Ester)

Specific examples of the polycondensed ester according to the invention are shown in the following Table 1, but it should not be construed that the invention is limited thereto.

TABLE 1

| | Dicarboxylic acid[1] | | Ratio of dicarboxylic acid (% by mole) | Diol | | | | Number average molecular weight |
|---|---|---|---|---|---|---|---|---|
| | Aromatic dicarboxylic acid | Aliphatic dicarboxylic acid | | Aliphatic diol | Ratio of diol (% by mole) | Average carbon atom number of aliphatic diol | Both terminals | |
| P-1 | PA | AA | 10/90 | Ethylene glycol | 100 | 2.0 | Acetyl ester residue structure | 1,000 |
| P-2 | PA | AA | 25/75 | Ethylene glycol | 100 | 2.0 | Acetyl ester residue structure | 1,000 |
| P-3 | PA | AA | 50/50 | Ethylene glycol | 100 | 2.0 | Acetyl ester residue structure | 1,000 |
| P-4 | PA | SA | 5/95 | Ethylene glycol | 100 | 2.0 | Acetyl ester residue structure | 1,000 |
| P-5 | PA | SA | 20/80 | Ethylene glycol | 100 | 2.0 | Acetyl ester residue structure | 1,000 |
| P-6 | TPA | AA | 15/85 | Ethylene glycol | 100 | 2.0 | Acetyl ester residue structure | 1,000 |
| P-7 | TPA | AA | 50/50 | Ethylene glycol | 100 | 2.0 | Acetyl ester residue structure | 1,000 |
| P-8 | TPA | SA | 5/95 | Ethylene glycol | 100 | 2.0 | Acetyl ester residue structure | 1,000 |
| P-9 | TPA | SA | 10/90 | Ethylene glycol | 100 | 2.0 | Acetyl ester residue structure | 1,000 |
| P-10 | TPA | SA | 15/85 | Ethylene glycol | 100 | 2.0 | Acetyl ester residue structure | 1,000 |
| P-11 | TPA | SA | 50/50 | Ethylene glycol | 100 | 2.0 | Acetyl ester residue structure | 1,000 |
| P-12 | TPA | SA | 70/30 | Ethylene glycol | 100 | 2.0 | Acetyl ester residue structure | 1,000 |
| P-13 | TPA/PA | AA | 10/10/80 | Ethylene glycol | 100 | 2.0 | Acetyl ester residue structure | 1,000 |
| P-14 | TPA/PA | AA | 20/20/60 | Ethylene glycol | 100 | 2.0 | Acetyl ester residue structure | 1,000 |
| P-15 | TPA/PA | AA/SA | 10/10/40/40 | Ethylene glycol | 100 | 2.0 | Acetyl ester residue structure | 1,000 |
| P-16 | TPA | AA/SA | 10/30/60 | Ethylene glycol | 100 | 2.0 | Acetyl ester residue structure | 1,000 |
| P-17 | TPA | AA/SA | 10/30/60 | Ethylene glycol/ 1,2-Propane-diol | 50/50 | 2.5 | Acetyl ester residue structure | 1,000 |
| P-18 | TPA | AA/SA | 10/30/60 | 1,2-Propane diol | 100 | 3.0 | Acetyl ester residue structure | 1,000 |
| P-19 | TPA | AA/SA | 10/30/60 | Ethylene glycol | 100 | 2.0 | Acetyl ester residue structure | 700 |
| P-20 | TPA | AA/SA | 10/30/60 | Ethylene glycol | 100 | 2.0 | Acetyl ester residue structure | 850 |
| P-21 | TPA | AA/SA | 10/30/60 | Ethylene glycol | 100 | 2.0 | Acetyl ester residue structure | 1,200 |
| P-22 | TPA | AA/SA | 10/30/60 | Ethylene glycol | 100 | 2.0 | Acetyl ester residue structure | 1,600 |
| P-23 | TPA | AA/SA | 10/30/60 | Ethylene glycol | 100 | 2.0 | Acetyl ester residue structure | 2,000 |
| P-24 | TPA | AA/SA | 10/30/60 | Ethylene glycol | 100 | 2.0 | Propionyl ester residue structure | 1,000 |
| P-25 | TPA | AA/SA | 10/30/60 | Ethylene glycol | 100 | 2.0 | Butanoyl ester residue structure | 1,000 |
| P-26 | TPA | AA/SA | 10/30/60 | Ethylene glycol | 100 | 2.0 | Benzoyl ester residue structure | 1,000 |
| P-27 | IPA | AA/SA | 20/40/40 | Ethylene glycol | 100 | 2.0 | Acetyl ester residue structure | 1,000 |
| P-28 | 2,6-NPA | AA/SA | 20/40/40 | Ethylene glycol | 100 | 2.0 | Acetyl ester residue structure | 1,200 |
| P-29 | 1,5-NPA | AA/SA | 20/40/40 | Ethylene glycol | 100 | 2.0 | Acetyl ester residue structure | 1,200 |
| P-30 | 1,4-NPA | AA/SA | 20/40/40 | Ethylene glycol | 100 | 2.0 | Acetyl ester residue structure | 1,200 |
| P-31 | 1,8-NPA | AA/SA | 20/40/40 | Ethylene glycol | 100 | 2.0 | Acetyl ester residue structure | 1,200 |
| P-32 | 2,8-NPA | AA/SA | 20/40/40 | Ethylene glycol | 100 | 2.0 | Acetyl ester residue structure | 1,200 |
| P-33 | TPA/PA | AA/SA | 45/5/25/25 | Ethylene glycol | 100 | 2.0 | Acetyl ester residue structure | 750 |
| P-34 | TPA/PA | AA | 45/5/50 | Ethylene glycol | 100 | 2.0 | Acetyl ester residue structure | 800 |
| P-35 | TPA/PA | AA | 35/15/50 | Ethylene glycol | 100 | 2.0 | Acetyl ester residue structure | 800 |

TABLE 1-continued

| | Dicarboxylic acid*[1] | | Ratio of dicarboxylic acid (% by mole) | Diol | | | | Number average molecular weight |
|---|---|---|---|---|---|---|---|---|
| | Aromatic dicarboxylic acid | Aliphatic dicarboxylic acid | | Aliphatic diol | Ratio of diol (% by mole) | Average carbon atom number of aliphatic diol | Both terminals | |
| P-36 | TPA/PA | AA | 25/25/50 | Ethylene glycol | 100 | 2.0 | Acetyl ester residue structure | 800 |
| P-37 | TPA | AA | 50/50 | Ethylene glycol/ 1,2-Propane-diol | 50/50 | 2.5 | Acetyl ester residue structure | 1000 |
| P-38 | TPA | SA | 55/45 | Ethylene glycol/ 1,2-Propane-diol | 50/50 | 2.5 | Acetyl ester residue structure | 750 |

*[1]PA: Phthalic acid, TPA: Terephthalic acid, IPA: Isophthalic acid, AA: Adipic acid, SA: Succinic acid, 2,6-NPA: 2,6-Naphthalenedicarboxylic acid, 2,8-NPA: 2,8-Naphthalenedicarboxylic acid, 1,5-NPA: 1,5-Naphthalenedicarboxylic acid, 1,4-NPA: 1,4-Naphthalenedicarboxylic acid, 1,8-NPA: 1,8-Naphthalenedicarboxylic acid The polycondensed ester according to the invention can be easily synthesized in the usual way by any one of a hot melt condensation process by a polyesterification reaction or an ester exchange reaction among the foregoing aromatic dicarboxylic acid, aliphatic dicarboxylic acid, aliphatic diol having an average carbon atom number of 2.0 or more and not more than 3.0 and monocarboxylic acid or an interface condensation process among acid chlorides of these acids and the glycol. Also, the polycondensed ester according to the invention is described in detail in Koichi Murai, *Plasticizer—Theory and Application* (the First Edition, the First Print, published by Saiwai Shobo, Mar. 1, 1973). Also, raw materials disclosed in JP-A-05-155809, JP-A-05-155810, JP-A-5-197073, JP-A-2006-259494, JP-A-07-330670, JP-A-2006-342227, JP-A-2007-003679, etc. can be utilized.

The addition amount of the polycondensed ester of the invention is preferably from 0.1 to 25% by mass, more preferably from 1 to 20% by mass, and most preferably from 3 to 15% by mass relative to the amount of the cellulose ester.

The content of the raw material aliphatic diol, dicarboxylic acid ester or diol ester to be contained in the polycondensed ester of the invention is preferably less than 1% by mass, and more preferably less than 0.5% by mass in the cellulose ester film. Examples of the dicarboxylic acid ester include dimethyl phthalate, di(hydroxyethyl)phthalate, dimethyl terephthalate, di(hydroxyethyl)terephthalate, di(hydroxyethyl)adipate and di(hydroxyethyl)succinate. Examples of the diol ester include ethylene diacetate and propylene diacetate.

(Compound Having at Least Two Aromatic Rings)

It is preferable that the cellulose ester film of the invention further contains a compound having at least two aromatic rings.

The compound having at least two aromatic rings is hereunder described.

It is preferable that when uniformly aligned, the compound having at least two aromatic rings reveals optically positive uniaxiality.

The molecular weight of the compound having at least two aromatic rings is preferably from 300 to 1,200, and more preferably from 400 to 1,000.

In the case where the cellulose ester film of the invention is used as an optically compensatory film, in order to control optical characteristics, in particular Re to preferred values, stretching is effective. For the purpose of raising the Re, it is necessary to increase the refractive index anisotropy within the film plane, and one method thereof is to enhance the alignment of a principal chain of the polymer film by stretching. Also, by using a compound with large refractive index anisotropy, it is possible to further raise the refractive index anisotropy of the film. For example, in the foregoing compound having at least two aromatic rings, when a force by which the polymer principal chain is arranged conducts due to stretching, the alignment properties of the compound are enhanced, whereby it becomes easy to control the desired optical characteristics.

Examples of the compound having at least two aromatic rings include triazine compounds disclosed in JP-A-2003-344655; rod-shaped compounds disclosed in JP-A-2002-363343; and liquid crystalline compounds disclosed in JP-A-2005-134884 and JP-A-2007-119737. Of these, the foregoing triazine compounds or rod-shaped compounds are more preferable.

The compound having at least two aromatic rings can also be used in combinations of two or more kinds thereof.

The addition amount of the compound having at least two aromatic rings is preferably 0.05% or more and not more than 10%, more preferably 0.5% or more and not more than 8%, and further preferably 1% or more and not more than 5% in terms of a mass ratio relative to the cellulose ester.

Next, the cellulose ester film which can be used for a retardation film, a polarizing plate and so on is described in detail.

[Cellulose Ester]

In the cellulose ester film of the invention, examples of the cellulose ester include cellulose ester compounds; and compounds having an ester-substituted cellulose structure, which are obtained by biologically or chemically introducing a functional group into cellulose as a raw material.

The foregoing cellulose ester is an ester of cellulose and an acid. The acid constituting the ester is preferably an organic acid, more preferably a carboxylic acid, further preferably a fatty acid having from 2 to 22 carbon atoms, and most preferably a lower fatty acid having from 2 to 4 carbon atoms.

[Cellulose Acylate Raw Material Cotton]

Examples of the cellulose of the cellulose acylate raw material which is used in the invention include cotton linter and wood pulps (for example, hardwood pulps and soft wood pulps), and cellulose acylates obtained from any of these raw material celluloses can be used. If desired, a mixture thereof may be used. These raw material celluloses are described in detail in, for example, *Course of Plastic Materials* (17): *Cellulose Resins*, written by Marusawa and Uda and published by The Nikkan Kogyo Shimbun, Ltd. (1970); and *Journal of Technical Disclosure*, No. 2001-1745 (pages 7 to 8) by Japan Institute of Invention and Innovation. But, it should not be construed that the cellulose acylate film of the invention is limited thereto.

[Degree of Substitution of Cellulose Acylate]

The cellulose acylate manufactured from the foregoing cellulose as a raw material, which is suitable in the invention, is hereunder described.

The cellulose acylate which is used in the invention is one obtained by acylating hydroxyl groups of cellulose. As the substituent, any of substituents inclusive of from an acetyl group having 2 carbon atoms to one having 22 carbon atoms can be used. In the invention, the degree of substitution on hydroxyl groups of cellulose in the cellulose acylate is not particularly limited. The degree of substitution can be obtained by measuring a degree of bond of acetic acid and/or a fatty acid having from 3 to 22 carbon atoms, which is substituted on hydroxyl groups of cellulose, and then calculating. The measurement can be carried out in conformity with ASTM D-817-91.

Though the degree of substitution on hydroxyl groups of cellulose is not particularly limited, the degree of acyl substitution on hydroxyl groups of cellulose is preferably from 2.00 to 2.95.

As to acetic acid and/or the fatty acid having from 3 to 22 carbon atoms, which is substituted on hydroxyl groups of cellulose, the acyl group having from 2 to 22 carbon atoms may be an aliphatic group or an aryl group and is not particularly limited. The acyl group having from 2 to 22 carbon atoms may be a single group or a mixture of two or more kinds thereof. Examples thereof include alkyl carbonyl esters, alkenyl carbonyl esters, aromatic carbonyl esters and aromatic alkyl carbonyl esters of cellulose. These may further have a substituted group. Preferred examples of such an acyl group include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, t-butanoyl, cyclohexanecarbonyl, oleoyl, benzoyl, naphthylcarbonyl and cinnamoyl groups. Of these, acetyl, propionyl, butanoyl, dodecanoyl, octadecanoyl, t-butanoyl, oleoyl, benzoyl, naphthylcarbonyl and cinnamoyl are preferable: acetyl, propionyl and butanoyl are more preferable; and acetyl is the most preferable.

Of the acyl substituents substituting on hydroxyl groups of cellulose, in the case where the acyl substituent is substantially composed of at least two kinds of an acetyl group, a propionyl group and a butanoyl group, its total degree of substitution is preferably from 2.50 to 2.95. The degree of acyl substitution is more preferably from 2.60 to 2.95, and further preferably from 2.65 to 2.95.

In the case where the acyl substituent of the cellulose acylate is composed of only an acetyl group, its total degree of substitution is preferably from 2.00 to 2.95. Furthermore, the degree of substitution is preferably from 2.40 to 2.95, and more preferably from 2.85 to 2.95.

[Degree of Polymerization of Cellulose Acylate]

The degree of polymerization of the cellulose acylate which is preferably used in the invention is preferably from 180 to 700 in terms of a viscosity average degree of polymerization. In the cellulose acetate, the degree of polymerization is more preferably from 180 to 550, further preferably from 180 to 400, and especially preferably from 180 to 350. What the degree of polymerization is not more than the foregoing upper limit value is preferable because the viscosity of a dope solution of the cellulose acylate does not become excessively high, and the film preparation by means of casting can be easily achieved. What the degree of polymerization is the foregoing lower limit value or more is preferable because inconveniences such as a lowering of the strength of a prepared film are not caused. The viscosity average degree of polymerization can be measured by an intrinsic viscosity method by Uda, et al. (Kazuo Uda and Hideo Saito, *Sen'i Gakkaishi* (Journal of the Society of Fiber Science and Technology, Japan), Vol. 18, No. 1, pages 105 to 120 (1962)). This method is also disclosed in detail in JP-A-9-95538.

Also, the molecular weight distribution of the cellulose acylate which is preferably used in the invention is evaluated by means of gel permeation chromatography. It is preferable that its polydispersity index Mw/Mn (Mw: mass average molecular weight, Mn: number average molecular weight) is small and that the molecular weight distribution is narrow. A specific value of Mw/Mn is preferably from 1.0 to 4.0, more preferably from 2.0 to 4.0, and most preferably from 2.3 to 3.4.

[Manufacture of Cellulose Acylate Film]

The cellulose acylate film of the invention can be manufactured by a solvent casting process. In the solvent casting process, a film is manufactured by using a solution (dope) of the cellulose acylate dissolved in an organic solvent.

It is preferable that the organic solvent includes a solvent selected among ethers having from 3 to 12 carbon atoms, ketones having from 3 to 12 carbon atoms, esters having from 3 to 12 carbon atoms and halogenated hydrocarbons having from 1 to 6 carbon atoms.

The esters, ketones and esters may each have a cyclic structure. Compounds having any two or more of ether, ketone and ester functional groups (namely, —O—, —CO— and —COO—) can also be used as the organic solvent. The organic solvent may have other functional group such as an alcoholic hydroxyl group. In the case of an organic solvent having two or more kinds of functional groups, it is preferable that its carbon atom number falls within the foregoing preferred carbon atom number range of the solvent having any one of the functional groups.

Examples of the ether having from 3 to 12 carbon atoms include diisopropyl ether, dimethoxymethane, dimethoxyethane, 1,4-dioxane, 1,3-dioxolan, tetrahydrofuran, anisole and phenetole.

Examples of the ketone having from 3 to 12 carbon atoms include acetone, methyl ethyl ketone, diethyl ketone, diisobutyl ketone, cyclohexanone and methylcyclohexanone.

Examples of the ester having from 3 to 12 carbon atoms include ethyl formate, propyl formate, pentyl formate, methyl acetate, ethyl acetate and pentyl acetate.

Examples of the organic solvent having two or more kinds of functional groups include 2-ethoxyethyl acetate, 2-methoxyethanol and 2-butoxyethanol.

The carbon atom number of the halogenated hydrocarbon is preferably 1 or 2, and most preferably 1. The halogen of the halogenated hydrocarbon is preferably chlorine. A proportion of substitution of the hydrogen atom of the halogenated hydrocarbon with a halogen is preferably from 25 to 75% by mole, more preferably from 30 to 70% by mole, further preferably from 35 to 65% by mole, and most preferably from 40 to 60% by mole. Methylene chloride is a representative halogenated hydrocarbon.

A mixture of two or more kinds of the organic solvent may be used.

The cellulose acylate solution can be prepared in a general method of carrying out the treatment at a temperature of 0° C. or higher (ordinary temperature or high temperature). The preparation of the solution can be carried out using dope preparation method and apparatus in a usual solvent casting process. In the case of a general method, it is preferred to use a halogenated hydrocarbon (in particular, methylene chloride) as the organic solvent.

It is preferable that the cellulose acylate solution is prepared such that the cellulose acylate is contained in an amount of from 10 to 40% by mass in the obtained solution. The amount of the cellulose acylate is more preferably from 10 to 30% by mass. Arbitrary additives as described later may be added in the organic solvent (prime solvent).

The solution can be prepared by stirring the cellulose acylate and the organic solvent at ordinary temperature (from 0 to 40° C.). The high-concentration solution may be stirred under pressurization and heating conditions. Specifically, the cellulose acetate and the organic solvent are put in a pressure vessel and hermetically sealed, and the mixture is stirred under a pressure while heating at a temperature of a boiling point of the solvent at ordinary temperature or higher and falling within the range where the solvent does not boil.

The heating temperature is usually 40° C. or higher, preferably from 60 to 200° C., and more preferably from 80 to 110° C.

The respective components may be coarsely mixed and then put in the vessel. Also, the components may be successively charged in the vessel. It is necessary that the vessel is configured such that stirring can be achieved. The vessel can be pressurized by pouring an inert gas such as a nitrogen gas. Also, a raise of the vapor pressure of the solvent due to heating may be utilized. Alternatively, after hermetically sealing the vessel, the respective components can be added under a pressure.

In the case of carrying out heating, it is preferable that heating is carried out from the outside of the vessel. For example, a jacket type heating apparatus can be used. Also, the whole of the vessel can be heated by providing a plate heater on the outside of the vessel, laying a pipe and circulating a liquid thereinto.

It is preferred to provide a stirring blade in the inside of the vessel and carrying out stirring using this. The stirring blade is preferably one having a length so as to reach the vicinity of a wall of the vessel. It is preferable that a scraping blade is provided at the end of the stirring blade for the purpose of renewing a liquid film of the wall of the vessel.

Measuring instruments such as a pressure gauge and a thermometer may be provided in the vessel. In the vessel, the respective components are dissolved in a solvent. The prepared dope is cooled and then taken out from the vessel, or taken out from the vessel and then cooled by using a heat exchanger or the like.

The cellulose acylate film is manufactured from the prepared cellulose acylate solution (dope) by a solvent casting process. It is preferred to add the retardation raising agent to the dope.

The dope is cast on a drum or a band, and the solvent is vaporized to form a film. It is preferable that the dope before casting is adjusted so as to have a concentration in the range of from 18 to 35% in terms of solids content. It is preferable that the surface of the drum or band is mirror-finished. It is preferable that the dope is cast on the drum or band having a surface temperature of not higher than 10° C.

In the invention, in the case of casting the dope (cellulose acylate solution) on a band, in the first half of drying before stripping, a step of drying is carried out under a substantially calm condition for a time of 10 seconds or more and not more than 90 seconds, and preferably 15 seconds or more and not more than 90 seconds. Also, in the case of casting the dope (cellulose acylate solution) on a drum, a step of drying is carried out under a substantially calm condition for a time of 1 second or more and not more than 10 seconds, and preferably 2 seconds or more and not more than 5 seconds.

In the invention, the terms "drying before stripping" refer to drying from coating of the dope on the band or drum until stripping as a film. Also, the terms "first half" refer to a step before a half of the total time required from coating of the dope until stripping. The terms "under a substantially calm condition" refer to the matter that an airflow rate of 0.5 m/sec or more is not detected at a distance of not more than 200 mm from the band surface or drum surface (the airflow rate is less than 0.5 m/s).

In the case on the band, the first half of drying before stripping is usually a time of from about 30 to 300 seconds, and drying is carried out under a calm condition for a time of 10 seconds or more and not more than 90 seconds, and preferably 15 seconds or more and not more than 90 seconds within the foregoing time. In the case of on the drum, the first half of drying before stripping is usually a time of from about 3 to 30 seconds, and drying is carried out under a calm condition for a time of 1 second or more and not more than 10 seconds, and preferably 2 seconds or more and not more than 5 seconds within the foregoing time. The circumferential temperature is preferably from 0° C. to 180° C., and more preferably from 40° C. to 150° C. Though the operation of drying under a calm condition can be carried out at any stage in the first half of drying before stripping, it is preferably carried out just immediately after casting. In the case on the band, when the time for drying under a calm condition is less than 10 seconds (less than one second in the case on the drum), it is difficult to uniformly distribute the additives in the film, whereas when it exceeds 90 seconds (exceeding 10 seconds in the case on the drum), the film is stripped in an insufficient drying state, whereby the surface properties of the film are deteriorated.

At other time than drying under a calm condition in drying before stripping, drying can be carried out while blowing an inert gas. At that time, the air temperature is preferably from 0° C. to 180° C., and more preferably from 40° C. to 150° C.

The drying method in the solvent casting process is disclosed in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430 and JP-A-62-115035. Drying on the band or drum can be carried out while blowing an inert gas such as air and nitrogen.

The obtained film is stripped from the drum or band and further dried by high-temperature air while successively changing the temperature from 100° C. to 160° C., whereby the residual solvent can be evaporated. The foregoing method is disclosed in JP-B-5-17844. According to this method, it is possible to shorten a time of from casting to stripping. In order to carry out this method, it is necessary that the dope is gelled at the surface temperature of the drum or band at the time of casting.

The formation of a film can also be carried out by using the prepared cellulose acylate solution (dope) and casting it into two or more layers. In that case, it is preferred to prepare the cellulose acylate film by a solvent casting process. The dope is cast on a drum or a band, and the solvent is vaporized to form a film. It is preferable that the dope before casting is adjusted so as to have a concentration in the range of from 10 to 40% in terms of solids content. It is preferable that the surface of the drum or band is mirror-finished.

In the case of casting the cellulose acylate solution of two or more plural layers, plural cellulose acylate solutions can be cast. A film may be prepared while casting each cellulose acylate-containing solution from plural casting nozzles provided at intervals in the movement direction of the support and stacking. For example, methods disclosed in JP-A-61-158414, JP-A-1-122419 and JP-A-11-198285 can be employed. Also, the formation of a film can also be carried out by casting the cellulose acylate solution from two casting nozzles. For example, methods disclosed in JP-B-60-27562, JP-A-61-94724, JP-A-61-94725, JP-A-61-104813, JP-A-61-158413 and JP-A-6-134933 can be employed. Also, a casting method disclosed in JP-A-56-162617, in which a flow of a high-viscosity cellulose acylate solution is encompassed by a low-viscosity cellulose acylate solution, and the high-viscosity and low-viscosity cellulose acylate solutions are simultaneously extruded, can also be employed.

Also, a film can be prepared by using two casting nozzles, stripping a film formed on a support by a first casting nozzle and then subjecting the side of the film coming into contact with the support surface to second casting. For example, a method disclosed in JP-B-44-20235 can be exemplified.

With respect to the cellulose acylate solutions to be cast, the same solution may be used, or different cellulose solutions may be used. For the purpose of making plural cellulose acylate layers have a function, a cellulose acylate solution corresponding to the respective function may be extruded from the respective casting nozzle. Furthermore, the cellulose acylate solution of the invention can be cast simultaneously with other functional layer (for example, an adhesive layer, a dye layer, an antistatic layer, an anti-halation layer, an ultraviolet ray absorbing layer, a polarizing layer, etc.).

In conventional single-layer solutions, in order to bring the film with a necessary thickness, it is required to extrude a high-viscosity cellulose acylate solution in a high concentration. In that case, there was often encountered a problem that the stability of the cellulose acylate solution is so poor that solids are generated, thereby causing a spitting fault or inferiority in planarity. As a method for solving this problem, by casting plural cellulose acylate solutions from casting nozzles, high-viscosity solutions can be extruded onto the support at the same time, and a film having improved planarity and excellent surface properties can be prepared. Also, by using concentrated cellulose acylate solutions, a reduction of a drying load can be achieved, and the production speed of the film can be enhanced.

A width of the cellulose ester film of the invention is preferably from 0.5 to 5 m, and more preferably from 0.7 to 3 m; and a winding length of the film is preferably from 300 to 30,000 m, more preferably from 500 to 10,000 m, and further preferably from 1,000 to 7,000 m.

(Film Thickness)

A film thickness of the cellulose ester film of the invention is preferably from 20 µm to 180 µm, more preferably from 30 µm to 120 µm, and further preferably from 40 µm to 100 µm. What the film thickness is 20 µm or more is preferable in view of handling properties during processing into a polarizing plate or the like and curl inhibition of a polarizing plate. Also, unevenness in film thickness of the cellulose ester film of the invention is preferably from 0 to 2%, more preferably from 0 to 1.5%, and especially preferably from 0 to 1% in any of the conveyance direction and the width direction.

(Additives)

In the cellulose acylate film, a deterioration preventive agent (for example, an antioxidant, a peroxide decomposing agent, a radical inhibitor, a metal inactivating agent, an acid scavenger, an amine, etc.) may be added. The deterioration preventive agent is disclosed in JP-A-3-199201, JP-A-5-194789, JP-A-5-271471 and JP-A-6-107854. From the viewpoints of revealing an effect by the addition of the deterioration preventive agent and suppressing bleedout of the deterioration preventive agent onto the film surface, the addition amount of the deterioration preventive agent is preferably from 0.01 to 1% by mass, and more preferably from 0.01 to 0.2% by mass relative to the solution (dope) to be prepared.

Examples of the deterioration preventive agent which is especially preferable include butylated hydroxytoluene (BHT) and tribenzylamine (TBA).

An ultraviolet absorber may be added to the cellulose ester film of the invention. As the ultraviolet absorber, compounds disclosed in JP-A-2006-282979 (for example, benzophenone, benzotriazole, triazine, etc.) are preferably useful. The ultraviolet absorber can be used in combinations of two or more kinds thereof.

As the ultraviolet absorber, benzotriazole is preferable, and specific examples thereof include TINUVIN 328, TINUVIN 326, TINUVIN 329, TINUVIN 571 and ADEKASTAB LA-31.

The use amount of the ultraviolet absorber is preferably not more than 10%, more preferably not more than 3%, and most preferably not more than 2% and 0.05% or more in terms of a mass ratio relative to the cellulose ester.

(Matting Agent Fine Particle)

It is preferable that the cellulose ester film of the invention contains a fine particle as a matting agent. Examples of the fine particle which is used in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. As the fine particle, one containing silicon is preferable in view of the matter that the turbidity is low, and silicon dioxide is especially preferable. As the fine particle of silicon dioxide, one having a primary average particle size of not more than 20 nm and an apparent specific gravity of 70 g/L or more is preferable. One having a small average particle size of primary particle as from 5 to 16 nm is more preferable because the haze of the film can be reduced. The apparent specific gravity is preferably from 90 to 200 g/L or more, and more preferably from 100 to 200 g/L or more. What the apparent specific gravity is large is preferable because a dispersion with a high concentration can be prepared, and the haze and the coagulated material are improved. A desired embodiment is described in detail on pages 35 to 36 of *Journal of Technical Disclosure*, No. 2001-1745, issued Mar. 15, 2001 by Japan Institute of Invention and Innovation and can also be preferably employed in the cellulose ester film of the invention.

[Stretching]

In the cellulose ester film of the invention, the retardation can be adjusted by a stretching treatment. A method for positively stretching the film in a width direction (a direction vertical to the conveyance direction) is disclosed in, for example, JP-A-62-115035, JP-A-4-152125, JP-A-4-284211, JP-A-4-298310 and JP-A-11-48271. Stretching of the film is carried out under an ordinary temperature or heating condition. The heating temperature is preferably within the range of ±20° C. sandwiching the glass transition temperature of the film. When the film is stretched at a temperature extremely lower than the glass transition temperature, the film is easily broken, whereby the desired optical characteristics cannot be revealed. Also, when the film is stretched at a temperature extremely higher than the glass transition temperature, the film is relaxed by the heat at the time of stretching before one having been subjected to molecular alignment is thermally fixed, and the alignment cannot be fixed, whereby the revelation properties of optical characteristics are deteriorated.

Furthermore, in a stretching zone (for example, a tenter zone), a zone where the film is bitten, conveyed and after going through a maximum widening rate, usually relaxed is provided. This is a zone necessary for reducing axis offset. In usual stretching, in a relaxation rate zone after going through this maximum widening rate, a time until the film passes through a tenter zone is shorter than one minute, and stretching of the film may be uniaxial stretching in only a conveyance direction or a width direction, or may be simultaneous or sequential biaxial stretching. However, it is preferable that stretching is carried out dominantly in a width direction. Stretching in a width direction is preferably stretching with from 5 to 100%, and especially preferably stretching with from 5 to 80%. Also, the stretching treatment may be carried out on the way of a fabrication step, and a raw fabric which has been fabricated and wound up may be subjected to a stretching treatment. In the former case, stretching may be carried out in a state including a residual solvent amount [(mass of residual volatile component)/(film mass after heat treatment)×100%]. The stretching can be preferably carried out in a state that the residual solvent amount is from 0.05 to 50%. It is especially preferable that the stretching is carried out in a ratio of 5 to 80% in a state that the residual solvent amount is from 0.05 to 5%.

Also, the cellulose ester film of the invention may be subjected to biaxial stretching.

The biaxial stretching includes a simultaneous biaxial stretching process and a sequential biaxial stretching process. From the viewpoint of continuous manufacture, a sequential biaxial stretching process is preferable. After casting the dope, the film is stripped from the band or drum and stretched in a width direction and then in a longitudinal direction, or stretched in a longitudinal direction and then in a width direction.

The step from casting to post-drying may be carried out in an air atmosphere or an inert gas atmosphere of a nitrogen gas, etc. As a winder which is used in manufacturing the cellulose ester film of the invention, a generally used winder may be used; and the cellulose ester film can be wound up by a winding method, for example, a constant-tension method, a constant-torque method, a taper tension method and a program tension control method in which an internal stress is constant.

[Surface Treatment of Cellulose Ester Film]

It is preferable that the cellulose ester film is subjected to a surface treatment. Specific examples thereof include a corona discharge treatment, a glow discharge treatment, a flame treatment, an acid treatment, an alkali treatment and an ultraviolet ray irradiation treatment. Also, it is preferable to provide an undercoat layer as disclosed in JP-A-7-333433.

From the viewpoint of keeping planarity of the film, it is preferred to regulate the temperature of the cellulose ester film in such a treatment to not higher than Tg (glass transition temperature), specifically not higher than 150° C.

In the case where the cellulose ester film of the invention is used as a transparent protective film of a polarizing plate, from the viewpoint of adhesiveness to a polarizer, it is especially preferable that the cellulose ester film is subjected to an acid treatment or an alkali treatment, namely a saponification treatment for the cellulose ester.

The surface energy is preferably 55 mN/m or more, and more preferably 60 mN/m or more and not more than 75 mN/m.

The alkali saponification treatment is hereunder specifically described.

It is preferable that the alkali saponification treatment of the cellulose ester film is carried out in a cycle of dipping the film surface in an alkaline solution, neutralizing with an acidic solution, washing with water and drying.

Examples of the alkaline solution include a potassium hydroxide solution and a sodium hydroxide solution. A hydroxyl ion concentration is preferably in the range of from 0.1 to 3.0 moles/L, and more preferably in the range of from 0.5 to 2.0 moles/L. The temperature of the alkaline solution is preferably in the range of from room temperature to 90° C., and more preferably in the range of from 40 to 70° C.

The surface energy of a solid can be determined by a contact angle method, a wet heat method or an adsorption method as described in *Basis and Application of Wetting* (published by Realize Inc, Dec. 10, 1989). In the case of the cellulose ester film of the invention, it is preferred to adopt a contact angle method.

Specifically, two kinds of solutions each having known surface energy are dropped on the cellulose ester film; at a point of intersection at which the surface of the droplet and the film surface cross each other, an angle formed by a tangential line to the droplet and the film surface and including the droplet is defined as a contact angle; and the surface energy of the film can be calculated therefrom by means of calculation.

(Retardation of Film)

In this specification, $Re(\lambda)$ and $Rth(\lambda)$ represent an in-plane retardation and a retardation in a thickness direction at a wavelength of $\lambda$, respectively. Re is measured by making light having a wavelength of $\lambda$ nm incident in a normal direction of the film in KOBRA 21ADH (manufactured by Oji Scientific Instruments). Rth is computed by KOBRA 21ADH on the basis of retardation values measured in three directions in total including the foregoing Re, a retardation value measured by making light having a wavelength of $\lambda$ nm incident from an inclined direction at +40 degrees against the normal direction of the film by forming an in-plane slow axis (determined by KOBRA 21ADH) as an axis of tilt (rotating axis) and a retardation value measured by making light having a wavelength of $\lambda$ nm incident from an inclined direction at −40 degrees against the normal direction of the film by forming the in-plane slow axis as an axis of tilt (rotating axis), a hypothesized value of average refractive index and an inputted film thickness value. Here, as the hypothesized value of average refractive index, values described in *Polymer Handbook* (John Wiley & Sons, Inc.) and catalogues of various optical films can be employed. When a value of average refractive index is not known, it can be measured by an ABBE's refractometer. Values of average refractive index of major optical films are enumerated as follows: cellulose acylate (1.48), cycloolefin polymer (1.52), polycarbonate (1.59), polymethyl methacrylate (1.49) and polystyrene (1.59). By inputting such a hypothesized value of average refractive index and a thickness of the film, nx, ny and nz are computed by KOBRA 21ADH. $Nz=(nx-nz)/(nx-ny)$ is further computed from the thus computed nx, ny and nz.

The cellulose ester film of the invention is used as a protective film of a polarizing plate. In particular, the cellulose ester film of the invention can also be preferably as a retardation film corresponding to various liquid crystal modes.

When the cellulose ester film of the invention is used as a retardation film, preferable optical characteristics of the cellulose ester film vary depending upon the liquid crystal mode.

For the VA mode, Re measured at 590 nm is preferably from 20 to 150 nm, more preferably from 50 to 130 nm, and further preferably from 70 to 120 nm; and Rth is preferably from 100 to 300 nm, more preferably from 120 to 280 nm, and further preferably from 150 to 250 nm.

For the TN mode, Re measured at 590 nm is preferably from 0 to 100 nm, more preferably from 20 to 90 nm, and further preferably from 50 to 80 nm; and Rth is preferably from 20 to 200 nm, more preferably from 30 to 150 nm, and further preferably from 40 to 120 nm.

For the TN mode, an optically anisotropic layer is coated on the cellulose ester film having the foregoing retardation value, and the resulting film can be used as a retardation film.

(Haze of Film)

A haze of the cellulose ester film of the invention is preferably from 0.01 to 2.0%, more preferably from 0.05 to 1.5%, and further preferably from 0.1 to 1.0%. Transparency of the film is important as an optical film. The haze of a cellulose ester film sample (40 mm×80 mm) of the invention was measured at 25° C. and 60% RH by using a haze meter (HGM-2DP, manufactured by Suga Test Instruments Co., Ltd.) in conformity with JIS K-6714.

(Spectral Characteristics and Spectral Transmittance)

A cellulose ester film sample (13 mm×40 mm) can be measured for transmittance at a wavelength of from 300 to 450 nm at 25° C. and 60% RH by using a spectrophotometer (U-3210, manufactured by Hitachi, Ltd.). A tilt width can be determined by [(wavelength of 72%)−(wavelength of 5%)]. A threshold wavelength can be expressed by a wavelength of [(tilt width)/2+5%]; and an absorption edge can be expressed by a wavelength at a transmittance of 0.4%. According to this, a transmittance at each of 380 nm and 350 nm can be evaluated.

In the case where the cellulose ester film of the invention is used on the opposing side of a protective film facing a liquid crystal cell of a polarizing plate, it is preferable that a spectral transmittance at a wavelength of 380 nm as measured by the foregoing method is 45% or more and not more than 95% and that and a spectral transmittance at a wavelength of 350 nm is not more than 10%.

(Glass Transition Temperature)

A glass transition temperature of the cellulose ester film of the invention is preferably 120° C. or higher, and more preferably 140° C. or higher.

The glass transition temperature can be determined as an average value between a temperature at which, when measured at a temperature rise rate of 10° C./min using a differential scanning calorimeter (DSC), a baseline starts to change deriving from glass transition of the film and a temperature at which the film again returns to the baseline.

Also, the glass transition temperature can be determined using the following dynamic viscoelasticity measuring apparatus. A cellulose ester film sample (unstretched) (5 mm×30 mm) of the invention is humidified at 25° C. and 60% RH for 2 hours or more and then measured using a dynamic viscoelasticity measuring apparatus (VIBRON: DVA225, manufactured by IT Keisoku Seigyo Co., Ltd.) at a distance between grips of 20 mm, a temperature rise rate of 2° C./min, a measurement temperature range of from 30° C. to 250° C. and a frequency of 1 Hz. When a storage modulus is plotted on the ordinate in terms of a logarithmic axis, and a temperature (° C.) is plotted on the abscissa in terms of a linear axis; an abrupt reduction of the storage modulus which is observed during transfer from a solid region to a glass transition region is drawn as a straight line 1 in the solid region and drawn as a straight line 2 in the glass transition region; and a point of intersection between the straight line 1 and the straight line 2 is a temperature at which the storage modulus abruptly reduces at the time of temperature rise, and the film starts to become soft and is a temperature at which the film starts to transfer into the glass transition region. Thus, this temperature is defined as a glass transition temperature Tg (dynamic viscoelasticity).

(Equilibrium Moisture Content of Film)

With respect to an equilibrium moisture content of the cellulose ester film of the invention, when the cellulose ester film is used as a protective film of a polarizing plate, for the purpose of not impairing the adhesiveness to a water-soluble polymer such as polyvinyl alcohol, the equilibrium moisture content at 25° C. and 80% RH is preferably from 0 to 4%, more preferably from 0.1 to 3.5%, and especially preferably from 1 to 3% regardless of the film thickness. What the equilibrium moisture content is not more than 4% is preferable because when used as a support of an optically compensatory film, the dependency of the retardation due to a humidity change does not become excessively large.

The moisture content was measured with respect to a cellulose ester film sample (7 mm×35 mm) of the invention using a moisture measuring system and a sample dryer: CA-03 and VA-05 (both of which are manufactured by Mitsubishi Chemical Corporation) by the Karl Fischer's method. The equilibrium moisture content was calculated by dividing the water content (g) by the sample mass (g).

(Water Vapor Permeability of Film)

A water vapor permeability of the film is measured under a condition at 60° C. and 95% RH in conformity with JIS Z-0208.

When the thickness of the cellulose ester film is thick, the water vapor permeability is small, whereas when it is thin, the water vapor permeability is large. In samples having a different film thickness from each other, it is necessary to convert the film thickness while providing a basis at 80 μm. The conversion of the film thickness can be achieved according to the following numerical expression.

Numerical Expression (Water vapor permeability converted at 80 μm)=(Measure water vapor permeability)×[Measured film thickness (μm)]/80 (μm)

With respect to the measurement of the water vapor permeability, a method described in *Physical Properties II of Polymers* (*Course* 4 *of Polymer Experiments*), published by Kyoritsu Shuppan Co., Ltd., pages 285 to 294, "Measurement of Vapor Permeation Amount (Mass Method, Thermometer Method, Vapor Pressure Method and Adsorption Amount Method)" can be applied.

The water vapor permeability of the cellulose ester film of the invention is preferably from 400 to 2,000 $g/m^2 \cdot 24$ h, more preferably from 400 to 1,800 $g/m^2 \cdot 24$ h, and especially preferably from 400 to 1,600 $g/m^2 \cdot 24$ h. What the water vapor permeability is not more than 2,000 $g/m^2 \cdot 24$ h is preferable because inconvenience, for example, the matter that an absolute value of dependency of each of the Re value and the Rth value of the film on the humidity exceeds 0.5 nm/% RH, is not caused.

(Dimensional Change of Film)

With respect to the dimensional stability of the cellulose ester film of the invention, it is preferable that all of a rate of dimensional change in the case of allowing the cellulose ester film to stand under a condition at 60° C. and 90% RH for 24 hours (at a high humidity) and a rate of dimensional change in the case of allowing the cellulose ester film to stand under a condition at 90° C. and 5% RH for 24 hours (at a high temperature) are preferably not more than 0.5%, more preferably not more than 0.3%, and further preferably not more than 0.15%.

(Elastic Modulus of Film)

An elastic modulus of the cellulose ester film of the invention is preferably from 200 to 500 $kgf/mm^2$, more preferably from 240 to 470 $kgf/mm^2$, and further preferably from 270 to 440 $kgf/mm^2$. As a specific measurement method, the elastic modulus was determined by measuring a stress at an elongation of 0.5% at a tensile rate of 10%/min in an atmosphere of 23° C. and 70% RH using a universal tension tester, STM T50BP (manufactured by Toyo Baldwin Co., Ltd.).
(Configuration of Cellulose Ester Film)

Though the cellulose ester film of the invention may be of a single layer structure or may be configured of plural layers, it is preferably of a single layer structure. The film of a single layer structure as referred to herein means a single sheet of cellulose ester film but not a sheet prepared by sticking plural film materials. Also, there is included the case where a single sheet of cellulose ester film is manufactured from plural cellulose ester solutions by a sequential casting mode or a cocasting mode.

In that case, the cellulose ester film having distribution in a thickness direction can be obtained by properly adjusting the kind and blending amount of an additive, the molecular weight distribution of the cellulose ester, the kind of the cellulose ester and the like. Also, there is included a single sheet of film having various functional sections such as an optically anisotropic section, an antiglare section, a gas barrier section and a moisture resistant section.

<<Retardation Film>>

The cellulose ester film of the invention can be used as a retardation film. The "retardation film" as referred to herein means an optical material with optical anisotropy, which is in general used in a display device such as liquid crystal display devices, and is synonymous with a retardation plate, an optically compensatory film, an optically compensatory sheet, etc. In a liquid crystal display device, the retardation film is used for the purposes of enhancing the contrast of a display image and improving the viewing angle characteristic or tint.

By using the transparent cellulose ester film of the invention, it is possible to easily prepare a retardation film with freely controlled Re value and Rth value.

Also, a film prepared by stacking plural sheets of the cellulose ester film of the invention or stacking the cellulose ester film of the invention with a film falling outside the scope of the invention to properly adjust Re and Rth can be used as the retardation film. Stacking of films can be carried out using a pressure sensitive adhesive or an adhesive.

Also, according to circumstances, the cellulose ester film of the invention can be used as a retardation film by using it as a support of a retardation film and providing thereon an optically anisotropic layer composed of a liquid crystal, etc. The optically anisotropic layer which is applied for the retardation film of the invention may be made of a composition containing, for example, a crystalline compound, may be made of a cellulose ester film with birefringence, or may be made of the cellulose ester film of the invention.

As the liquid crystalline compound, a discotic liquid crystalline compound or a rod-shaped liquid crystalline compound is preferable.
(Discotic Liquid Crystalline Compound)

Examples of the discotic liquid crystalline compound which can be used as the liquid crystalline compound in the invention include compounds described in various documents (for example, C. Destrade, et al., *Mol. Crysr. Liq. Cryst.*, Vol. 71, page 111 (1981); *Quarterly Review of Chemistry*, No. 22, "Chemistry of Liquid Crystal", Chapter 5 and Chapter 10, Section 2 (1994), edited by The Chemical Society of Japan; B. Kohne, et al., *Angew. Chem. Soc. Chem. Comm.*, page 1794 (1985); and J. Zhang, et al., *J. Am. Chem. Soc.*, Vol. 116, page 2655 (1994)).

In the optically compensatory layer, the discotic liquid crystalline molecule is preferably fixed in an aligned state, and most preferably fixed through a polymerization reaction.

Also, the polymerization of the discotic liquid crystalline molecule is disclosed in JP-A-8-27284. In order to fix the discotic liquid crystalline molecule through polymerization, it is necessary that a polymerizable group is bound as a substituent to a disc-shaped core of the discotic liquid crystalline molecule. However, when the polymerizable group is bound directly to the disc-shaped core, it is difficult to keep the aligned state in the polymerization reaction. Then, a connecting group is introduced between the disc-shaped core and the polymerizable group. The polymerizable group-containing discotic liquid crystalline molecule is disclosed in JP-A-2001-4387.

<<Polarizing Plate>>

The cellulose ester film or retardation film of the invention can be used as a protective film of a polarizing plate (the polarizing plate of the invention). The polarizing plate of the invention is composed of a polarizer and two polarizing plate protective films (transparent films) protecting the both surfaces of the polarizer. The cellulose ester film or retardation film of the invention can be used as at least one polarizing plate protective film.

In the case where the cellulose ester film of the invention is used as the polarizing plate protective film, it is preferable that the cellulose ester film of the invention is hydrophilized upon being subjected to the foregoing surface treatment (also disclosed in JP-A-6-94915 and JP-A-6-118232). It is preferable that the cellulose ester film of the invention is subjected to, for example, a glow discharge treatment, a corona discharge treatment, an alkali saponification treatment, etc. In particular, in the case where the cellulose ester constituting the cellulose ester film of the invention is a cellulose acylate, an alkali saponification treatment is most preferably employed as the surface treatment.

Also, as the polarizer, for example, a polarizer which is prepared by dipping a polyvinyl alcohol film in an iodine solution and stretching it can be used. In the case of using a polarizer prepared by dipping a polyvinyl alcohol film in an iodine solution and stretching it, the surface-treated surface of the transparent cellulose ester film of the invention can be directly stuck on the both surfaces of the polarizer using an adhesive. In the manufacturing method of the invention, it is preferable that the cellulose ester film is directly stuck to the polarizer in such way. As the adhesive, an aqueous solution of polyvinyl alcohol or a polyvinyl acetal (for example, polyvinyl butyral) or a latex of a vinyl based polymer (for example, polybutyl acrylate) can be used. The adhesive is especially preferably an aqueous solution of completely saponified polyvinyl alcohol.

In general, since a liquid crystal display device is provided with a liquid crystal cell between two polarizing plates, it has four polarizing plate protective films. The cellulose ester film of the invention may be used in any of the four polarizing plate protective films. However, the cellulose ester film of the invention is especially advantageously used as a protective film to be disposed between the polarizer and the liquid crystal layer (liquid crystal cell) in the liquid crystal display device. Also, for the protective film to be disposed on the opposing side of the cellulose ester film of the invention relative to the polarizer, a transparent hard coat layer, an antiglare layer, an antireflection layer, etc. can be provided. In particular, the cellulose ester film of the invention is preferably used as a polarizing plate protective film of the outermost surface on the display side of the liquid crystal display device.

<<Liquid Crystal Display Device>>

The cellulose ester film, retardation film and polarizing plate of the invention can be used in liquid crystal display devices of various display modes. Each of the liquid crystal modes for which these films are used is hereunder described. Of these modes, the cellulose ester film, retardation film and polarizing plate of the invention are especially preferably used in liquid crystal display devices of a VA mode and an IPS mode. These liquid crystal display devices may be used in any of a transmission type, a reflection type and a semi-transmission type.

(TN Type Liquid Crystal Display Device)

The cellulose ester film of the invention may be used as a support of a retardation film of a TN type liquid crystal display device having a liquid crystal cell of a TN mode. The liquid crystal cell of a TN mode and the TN type liquid crystal display device have been well known from old. The retardation film to be used in the TN type liquid crystal display device can be prepared according to methods disclosed in JP-A-3-9325, JP-A-6-148429, JP-A-8-50206 and JP-A-9-26572 and also described in the reports of Mori, et al. (*Jpn. J. Appl. Phys.*, Vol. 36 (1997), page 143 and *Jpn. J. Appl. Phys.*, Vol. 36 (1997), page 1068).

(VA Type Liquid Crystal Display Device)

The cellulose ester film of the invention is especially advantageously used as a retardation film of a VA type liquid crystal display device having a liquid crystal cell of a VA mode or a support of a retardation film. The VA type liquid crystal display device may be an aligned and divided mode disclosed in, for example, JP-A-10-123576. In such embodiments, the polarizing plate using the cellulose ester film of the invention contributes to an enlargement of the viewing angle and an improvement of the contrast.

(IPS type liquid crystal display device and ECB type liquid crystal display device)

The cellulose ester film of the invention is especially advantageously used as a retardation film of an IPS type liquid crystal display device or ECB type liquid crystal display device having a liquid crystal cell of an IPS mode or ECB mode or a support of the retardation film, or a protective film of a polarizing plate. These modes are an embodiment in which liquid crystal materials are aligned substantially parallel at the time of black display, and the liquid crystal molecules are aligned parallel to the substrate surface in a state that no voltage is applied, thereby achieving black display. In such an embodiment, the polarizing plate using the cellulose ester film of the invention contributes to an enlargement of the viewing angle and an improvement of the contrast.

(Reflection Type Liquid Crystal Display Device)

The cellulose ester film of the invention is also advantageously used as a retardation film of a reflection type liquid crystal display device of a TN type, an STN type, a HAN type or a GH (guest-host) type. These display modes have been well known from old. The TN type reflection type liquid crystal display device is disclosed in JP-A-10-123478, WO 98/48320 and Japanese Patent No. 3022477. The retardation film to be used for the reflection type liquid crystal display device is disclosed in WO 00/65384.

(Other Liquid Crystal Display Devices)

The cellulose ester film of the invention is also advantageously used as a support of a retardation film of an ASM (axially symmetric aligned microcell) type liquid crystal display device having a liquid crystal cell of an ASM mode. The liquid crystal cell of an ASM mode is characterized in that the thickness of the cell is kept by a position-adjustable resin spacer. Other properties are the same as those in the liquid crystal cell of a TN mode. The liquid crystal cell of an ASM mode and the ASM type liquid crystal display device are described in the report of Kume, et al. (Kume, et al., *SID 98 Digest*, 1089 (1998)).

(Hard Coat Film, Antiglare Film and Antireflection Film)

According to circumstances, the cellulose ester film of the invention may be applied for a hard coat film, an antiglare film or an antireflection film. For the purpose of enhancing visibility of a flat panel displayer such as LCD, PDP, CRT and EL, any one or all of a hard coat layer, an antiglare layer and an antireflection layer can be given on one surface or both surfaces of the transparent cellulose ester film of the invention. Preferred embodiments as such an antiglare film or antireflection film are described in detail on pages 54 to 57 of *Journal of Technical Disclosure*, No. 2001-1745, issued Mar. 15, 2001 by Japan Institute of Invention and Innovation and can be preferably applied, too in the cellulose ester film of the invention.

EXAMPLES

The invention is hereunder specifically described with reference to the following Examples, but it should not be construed that the invention is limited thereto.

Example 1

Preparation of Cellulose Acylate Film 101

(Preparation of Cellulose Acylate Solution A-1)

The following composition was charged in a mixing tank and stirred while heating to dissolve the respective components, thereby preparing a cellulose acylate solution A-1. A degree of acetyl substitution was measured in conformity with ASTM D-817-91. A viscosity average degree of polymerization was measured by an intrinsic viscosity method by Uda, et al. (Kazuo Uda and Hideo Saito, *Sen'i Gakkaishi* (Journal of the Society of Fiber Science and Technology, Japan), Vol. 18, No. 1, pages 105 to 120 (1962)).

| Composition of cellulose acylate solution A-1 | |
|---|---|
| Cellulose acylate (degree of acetyl substitution: 2.86, viscosity average degree of polymerization: 310): | 100 parts by mass |
| Polycondensed ester P-8 described above: | 12 parts by mass |
| Methylene chloride: | 384 parts by mass |
| Methanol: | 69 parts by mass |
| Butanol: | 9 parts by mass |

(Preparation of Matting Agent Dispersion B-1)

The following composition was charged in a dispersing machine and stirred to dissolve the respective components, thereby preparing a matting agent dispersion B-1.

| Composition of matting agent dispersion B-1 | |
|---|---|
| Silica particle dispersion (average particle size: 16 nm), AEROSIL R972, manufactured by Nippon Aerosil Co., Ltd.: | 10.0 parts by mass |
| Methylene chloride: | 72.8 parts by mass |
| Methanol: | 3.9 parts by mass |
| Butanol: | 0.5 parts by mass |
| Cellulose acylate solution A-1: | 10.3 parts by mass |

(Preparation of Ultraviolet Absorber Solution C-1)

The following composition was charged in a separate mixing tank and stirred while heating to dissolve the respective components, thereby preparing an ultraviolet absorber solution C-1.

| Composition of ultraviolet absorber solution C-1 | |
|---|---|
| Ultraviolet absorber (UV-1 described below): | 4.0 parts by mass |
| Ultraviolet absorber (UV-2 described below): | 8.0 parts by mass |
| Ultraviolet absorber (UV-3 described below): | 8.0 parts by mass |
| Methylene chloride: | 55.7 parts by mass |
| Methanol: | 10 parts by mass |
| Butanol: | 1.3 parts by mass |
| Cellulose acylate solution A-1: | 12.9 parts by mass |

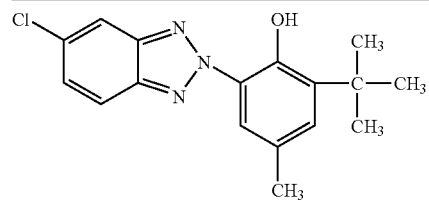

(UV-1)

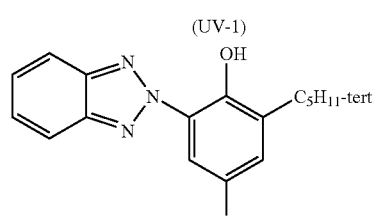

(UV-2)

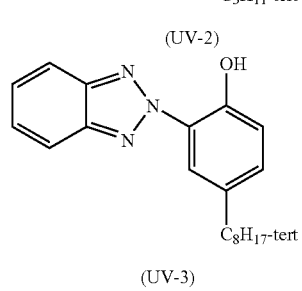

(UV-3)

(Preparation of Cellulose Acylate Film 101)

To a mixture of 94.6 parts by mass of the cellulose acylate solution A-1 and 1.3 parts by mass of the matting agent dispersion B-1, the ultraviolet absorber solution C-1 was added such that the amounts of the ultraviolet absorber (UV-2) and the ultraviolet absorber (UV-3) were 0.4 parts by mass, respectively, the amount of the ultraviolet absorber (UV-1) was 0.2 parts by mass, and the amount of the polycondensed ester P-8 was 12 parts by mass based on 100 parts by mass of the cellulose acylate. The mixture was thoroughly stirred while heating to dissolve the respective components, thereby preparing a dope. The obtained dope was heated to 30° C. and cast on a mirror-finished stainless steel support which is a drum having a diameter of 3 mm through a casting die. A surface temperature of the support was set up at −5° C., and a coating width was set up at 1,470 mm. A space temperature of the whole of the casting section was set up at 15° C. The cellulose ester film which had been cast and rotated was stripped from the drum 50 cm before an end section of the casting section, and the both ends of the film were then clipped by a pin tenter. A residual solvent amount of the cellulose acylate web immediately after stripping was 70%, and a film surface temperature of the cellulose acylate web was 5° C.

The cellulose acylate web kept by the pin tenter was conveyed into a drying zone. In initial drying, dry air at 45° C. was blown. Subsequently, drying was carried out at 110° C. for 5 minutes and then at 140° C. for 10 minutes; just before winding up, the both ends of the web were trimmed (5% of the whole width, respectively) and then subjected to knurling with a width of 10 mm and a height of 50 μm; and the web was then wound up in a roll form of 3,000 m. The thus obtained transparent film had a width of 1.45 m on each level, thereby preparing a cellulose acylate film sample 101.

(Preparation of Cellulose Acylate Films 102 to 125)

A dope was prepared in the same manner, except that in the preparation of the cellulose acylate film 101, a polycondensate as shown in Table 3 was used among the polycondensates described in the foregoing Table 1 and the following Table 2 in place of the polycondensed ester P-8 so as to have a composition as shown in Table 3. There were thus prepared cellulose acylate films 102 to 125.

TABLE 2

| | Dicarboxylic acid*[1] | | | Diol | | | | Number |
|---|---|---|---|---|---|---|---|---|
| | Aromatic dicarboxylic acid | Aliphatic dicarboxylic acid | Ratio of dicarboxylic acid (% by mole) | Aliphatic diol | Ratio of diol (% by mole) | Average carbon atom number of aliphatic diol | Both terminals | average molecular weight |
| Comparative polycondensate 1*[2] | TPA | SA | 5/95 | Ethylene glycol/ Diethylene glycol | 95/5 | 2.1 | Diol residue structure | 3,000 |
| Comparative polycondensate 2 | TPA | AA/SA | 10/30/60 | Ethylene glycol | 100 | 2.0 | Diol residue structure | 1,000 |
| Comparative polycondensate 5 | — | SA | 100 | Ethylene glycol | 100 | 2.0 | Acetyl ester residue structure | 1,000 |
| Comparative polycondensate 6 | TPA | AA/SA | 10/30/60 | 1,4-Butanediol | 100 | 4.0 | Acetyl ester residue structure | 1,000 |
| Comparative polycondensate 7 | PA | — | 100 | Ethylene glycol | 100 | 2.0 | Acetyl ester residue structure | 1,000 |
| Comparative polycondensate 8 | TPA | — | 100 | Ethylene glycol | 100 | 2.0 | Acetyl ester residue structure | 1,000 |
| Comparative polycondensate 9*[3] | TPA | SA | 15/85 | 1,4-Butanediol | 100 | 4.0 | Diol residue structure | 1,000 |
| Comparative polycondensate 10*[4] | — | AA | 100 | Propanediol | 100 | 3.0 | Diol residue structure | 980 |
| P-41 | TPA | SA | 5/95 | Ethylene glycol | 100 | 2.0 | Acetyl ester residue structure | 1,000 |

TABLE 2-continued

| | Dicarboxylic acid*[1] | | Ratio of dicarboxylic acid (% by mole) | Diol | | | | Number average molecular weight |
|---|---|---|---|---|---|---|---|---|
| | Aromatic dicarboxylic acid | Aliphatic dicarboxylic acid | | Aliphatic diol | Ratio of diol (% by mole) | Average carbon atom number of aliphatic diol | Both terminals | |
| P-42 | TPA | AA/SA | 10/30/60 | Ethylene glycol | 100 | 2.0 | 2-Ethylhexyl ester residue structure | 1,000 |
| P-43 | TPA | AA/SA | 10/30/60 | Ethylene glycol | 100 | 2.0 | Acetyl ester residue structure | 600 |
| P-44 | TPA | AA/SA | 10/30/60 | Ethylene glycol | 100 | 2.0 | Acetyl ester residue structure | 2,200 |

*[1]PA: Phthalic acid, TPA: Terephthalic acid, IPA: Isophthalic acid, AA: Adipic acid, SA: Succinic acid
*[2]Polyester polyol disclosed in JP-A-2006-6403
*[3]Analogous structure to the polyester disclosed in U.S. Pat. No. 5,559,171
*[4]Polyester disclosed in JP-A-2002-022956

Also, a loss on heating of each of the used polycondensates and low-molecular weight plasticizers was measured by a thermobalance method. A mass reduction factor when heated at 140° C. for 60 minutes is shown in Table 3 in terms of a loss on of each of the polycondensates and low-molecular weight plasticizers. When the value is large, there is a concern that the compound vaporizes at the time of drying of the cellulose acylate web, and the manufacturing step is contaminated, thereby causing area defects.

(Area Defects)

The obtained cellulose acetate film sample was wound up in a roll form, from which was then cut into a size of 100 mm×100 mm. The cut sample was observed by a polarizing microscope with a magnification of 30 times under a crossed Nicols and subjected to the following evaluation in terms of a number of spots where a foreign matter was generated. The foreign matter as referred to herein is observed as a bright spot under a polarizing microscope by a bleedout component derived from the polycondensate, plasticizer or other additive, the contamination on the surface or a deposit in the inside or on the surface of the film.

A: The number of foreign matters is from 0 to 4.
B: The number of foreign matters is from 5 to 10.
C: The number of foreign matters is from 11 to 50.
D: The number of foreign matters is 51 or more.

(Polarizing Plate Performance)

(1) Saponification of Film:

The obtained film was dipped in an NaOH aqueous solution (saponification solution) of 1.5 moles/L kept at 55° C. for 2 minutes and then washed with water. Thereafter, the film was dipped in a sulfuric acid aqueous solution of 0.05 moles/L at 25° C. for 30 seconds, and the water washing bath was passed through running water for 30 seconds, thereby converting the film in a neutral state. Then, draining by an air knife was repeated three times, and after removing water, the film was retained and dried in a drying zone at 70° C. for 15 seconds, thereby preparing a saponified film.

(2) Preparation of Polarizer:

Iodine was adsorbed onto a stretched polyvinyl alcohol film according to Example 1 of JP-A-2001-141926, thereby preparing a polarizer having a thickness of 20 μm.

(3) Sticking:

The prepared cellulose acylate film 101 was stuck on the both sides of the polarizer using a polyvinyl alcohol based adhesive and dried at 70° C. for 10 minutes or more. The obtained polarizing plate was designated as a polarizing plate 101. Polarizing plates 102 to 125 were prepared in the same manner using the cellulose acylate films 102 to 125, respectively.

(4) Evaluation of Polarizing Plate:

Two sets of samples obtained by sticking one of the film sides of the polarizing plate onto a glass plate using a pressure sensitive adhesive were prepared and disposed under a crossed Nicols, thereby measuring a transmittance (initial transmittance measured at 25° C. and 60% RH). Furthermore, the foregoing samples were allowed to stand under a condition at 60° C. and at a relative humidity of 90% for 1,000 hours. Thereafter, the resulting samples were further allowed to stand at 25° C. and 60% for 5 hours or more and then again disposed under a crossed Nicols, thereby measuring a transmittance (transmittance with time). A value obtained by multiplying a maximum change width between the initial transmittance and the transmittance with time within a wavelength range of from 400 nm to 700 nm by 100 was defined as an index of change with time of polarizing plate. A spectrophotometer "U-3210" (manufactured by Hitachi, Ltd.) was used for the measurement of a transmittance. The results obtained are shown in Table 3. The overall evaluation was shown while taking preference of the fact that the change with time of polarizing plate is small according to the following criteria.

A: Very good
B: Good
C: Slightly poor
D: Poor

TABLE 3

| Sample (Cellulose ester film) | Plasticizer or polycondensate*[1] | Polycondensate | | | | | Area defects | Change with time of polarizing plate | Overall evaluation*[2] |
|---|---|---|---|---|---|---|---|---|---|
| | | Ratio of aromatic dicarboxylic acid (% by mole) | Average carbon atom number of aliphatic diol | Both terminals | Number average molecular weight | Loss on heating of polycondensate or plasticizer (%) | | | |
| 101 | P-8 (12) | 5 | 2.0 | Acetyl ester residue structure | 1,000 | 0.22 | A | 7 | A |

TABLE 3-continued

| Sample (Cellulose ester film) | Plasticizer or polycondensate*[1] | Polycondensate Ratio of aromatic dicarboxylic acid (% by mole) | Average carbon atom number of aliphatic diol | Both terminals | Number average molecular weight | Loss on heating of polycondensate or plasticizer (%) | Area defects | Change with time of polarizing plate | Overall evaluation*[2] |
|---|---|---|---|---|---|---|---|---|---|
| 102 | P-10 (12) | 15 | 2.0 | Acetyl ester residue structure | 1,000 | 0.21 | A | 7 | A |
| 103 | P-12 (12) | 70 | 2.0 | Acetyl ester residue structure | 1,000 | 0.23 | A | 7 | A |
| 104 | P-20 (12) | 10 | 2.0 | Acetyl ester residue structure | 850 | 0.36 | B | 7 | A |
| 105 | P-16 (12) | 10 | 2.0 | Acetyl ester residue structure | 1,000 | 0.20 | A | 7 | A |
| 106 | P-18 (12) | 10 | 3.0 | Acetyl ester residue structure | 1,000 | 0.28 | B | 8 | B |
| 107 | Comparative condensate 6 (12) | 10 | 4.0 | Acetyl ester residue structure | 1,000 | 0.78 | C | 12 | D |
| 108 | P-19 (12) | 10 | 2.0 | Acetyl ester residue structure | 700 | 0.52 | C | 7 | B |
| 109 | P-23 (12) | 10 | 2.0 | Acetyl ester residue structure | 2,000 | 0.19 | A | 8 | B |
| 110 | P-43 (12) | 10 | 2.0 | Acetyl ester residue structure | 600 | 0.88 | C | 6 | B |
| 111 | P-44 (12) | 10 | 2.0 | Acetyl ester residue structure | 2,200 | 0.18 | A | 6 (Opaque) | C |
| 112 | Comparative condensate 2 (12) | 10 | 2.0 | Diol residue structure | 1,000 | 0.20 | A | 15 | D |
| 113 | Comparative condensate 1 (12) | 5 | 2.1 | Diol residue structure | 3,000 | 0.25 | A | 18 | D |
| 114 | P-42 (12) | 10 | 2.0 | 2-Ethylhexyl ester residue structure | 1,000 | 0.89 | C | 7 | B |
| 115 | P-24 (12) | 10 | 2.0 | Propionyl ester residue structure | 1,000 | 0.34 | B | 7 | B |
| 116 | P-26 (12) | 10 | 2.0 | Benzoyl ester residue structure | 1,000 | 1.1 | D | 5 | B |
| 117 | Comparative condensate 5 (12) | 0 | 2.0 | Acetyl ester residue structure | 1,000 | 0.27 | A | 23 | D |
| 118 | Triphenyl phosphate (5.0)/Biphenyl diphenyl phosphate (3.0)/Ethyl phthalyl ethyl glycolate (4.0) | — | — | — | — | 7.5 (Total amount) | D | 8 | C |
| 119 | Comparative condensate 9 (12) | 15 | 4.0 | Diol residue structure | 1,000 | 0.71 | C | 17 | D |
| 120 | Comparative condensate 10 (12) | 0 | 3.0 | Diol residue structure | 980 | 0.52 | C | 34 | D |
| 121 | Comparative condensate 7 (12) | 100 | 2.0 | Acetyl ester residue structure | 1,000 | 0.22 | Opaque | | D |
| 122 | Comparative condensate 8 (12) | 100 | 2.0 | Acetyl ester residue structure | 1,000 | 0.24 | Opaque | | D |
| 123 | P-34 (12) | 50 | 2.0 | Acetyl ester residue structure | 800 | 0.35 | A | 6 | A |
| 124 | P-36 (12) | 50 | 2.0 | Acetyl ester residue structure | 800 | 0.34 | A | 6 | A |
| 125 | P-37 (12) | 50 | 2.5 | Acetyl ester residue structure | 1000 | 0.17 | A | 16 | A |

*[1]The numerical value within the parenthesis is the addition amount (parts by mass) based on 100 parts by mass of the cellulose acylate.
*[2]The overall evaluation is shown while taking preference of the fact that the change with time of polarizing plate is small. A: Very good, B: Good, C: Slightly poor, D: Poor The cellulose ester films containing the polycondensed ester of the invention are small in the loss on heating, low in the process contamination and good in the film surface properties. Also, they are small in the change in performance of polarizing plate and excellent as a protective film.

In the case where the polycondensed ester is composed of only a fatty acid dicarboxylic acid without containing an aromatic dicarboxylic acid, the change in performance of polarizing plate is inadequate. Though the reason for this is not always elucidated, it is estimated that this is caused due to a lowering of water permeability of the film after a lapse of time (see the sample 117). Bleedout was generated in the samples 121 and 122, each of which is composed of only an aromatic dicarboxylic acid.

When the average carbon atom number of the aliphatic diol of the polycondensed ester is large, the loss on heating of the compound increases, and the area defects are generated due to the process contamination at the time of drying of the cellulose acylate web (see the sample 117).

Also, in the case where the terminals of the polycondensed ester are sealed, in the 2-ethylhexyl and benzoyl ester residue structures and the like, each of which has a large carbon atom number of the terminal structure, though the change in performance of polarizing plate is small, the loss on heating of the compound is large, so that there may be the case of generating area defects (see the samples 114 and 116). Also, in the case where the terminals are not sealed, the change in performance of polarizing plate is not sufficient (see the samples 112 and 113).

In the case where the average carbon atom number of each of the terminal-sealed ester derivative and aliphatic diol is not more than 3, it is possible to remove low-molecular weight components by means of pressure reduction in the synthesis step of a polycondensed ester or the like. Accordingly, in such a structure, the loss on heating of the compound is small, and there is a possibility that the process contamination is reduced.

When the average molecular weight of the polycondensed ester is less than 700, the increase of the low-molecular weight components affects the loss on heating, thereby producing a non-preferable tendency (see the sample 110). When the average molecular weight exceeds 2,000, the generation of bleedout is found, thereby producing a non-preferable tendency (see the sample 111).

Example 2

Preparation of Cellulose Acylate Film 201

(Preparation of Cellulose Acylate Solution A-2)

The following composition was charged in a mixing tank and stirred to dissolve the respective components. The solution was further heated at 90° C. for about 10 minutes and filtered through a filter paper having an average pore size of 34 µm and a sintered metal filter having an average pore size of 10 µm, thereby preparing a cellulose acylate solution A-2.

| Composition of cellulose acylate solution A-2 | |
|---|---|
| Cellulose acylate (degree of acetyl substitution: 2.86, viscosity average degree of polymerization: 310): | 100.0 parts by mass |
| Polycondensed ester P-15 described above: | 12.0 parts by mass |
| Methylene chloride: | 403.0 parts by mass |
| Methanol: | 60.2 parts by mass |

(Preparation of Matting Agent Dispersion B-2)

Subsequently, the following composition containing the above-prepared cellulose acylate solution was charged in a dispersing machine, thereby preparing a matting agent dispersion B-2.

| Composition of matting agent dispersion B-2 | |
|---|---|
| Silica particle dispersion having an average particle size of 16 nm, AEROSIL R972, manufactured by Nippon Aerosil Co., Ltd.: | 2.0 parts by mass |
| Methylene chloride: | 72.4 parts by mass |
| Methanol: | 10.8 parts by mass |
| Cellulose acylate solution A-2: | 10.3 parts by mass |

(Preparation of Retardation Revealing Agent Solution C-2)

Subsequently, the following composition containing the above-prepared cellulose acylate solution was charged in a mixing tank and stirred while heating to dissolve the respective components, thereby preparing a retardation revealing agent solution C-2.

| Composition of retardation revealing agent solution C-2 | |
|---|---|
| Compound (A) described below: | 7.5 parts by mass |
| Compound (B) described below: | 7.5 parts by mass |
| Methylene chloride: | 63.5 parts by mass |
| Methanol: | 9.5 parts by mass |
| Cellulose acylate solution A-2: | 14.0 parts by mass |

100 parts by mass of the cellulose acylate solution A-2, 1.35 parts by mass of the matting agent dispersion B-2 and the retardation revealing agent solution C-2 in such an amount that the amounts of the compound (A) and the compound (B) were 2.5 parts by mass and 2.5 parts by mass, respectively based on 100 parts by mass of the cellulose acylate were mixed, thereby preparing dope for fabrication.

(Casting and Stretching Step)

A two-phase stainless steel of a coat hanger type having a material quality with a mixed composition of an austenite phase and a ferrite phase was used. A stainless steel-made endless band having a length of 100 m was used as a support. A casting chamber provided with the foregoing casting die and support and the like was kept at a temperature of 35° C. The film was peeled away from the casting support at a point of time when a solvent ratio in the dope reached 45% by mass on a dry weight basis. At that time, a peel tension was 8 kgf/m, and a stripping rate (stripping roll draw) was adequately set up within the range of from 100.1% to 110% relative to the rate of the support. The stripped film was conveyed within a drying zone of a tenter having clips while being fixed at the both terminals by the tenter. The inside of the tenter was divided into 3 zones, and the temperature of dry air of the divided zone was set up at 90° C., 100° C. and 110° C., respectively from the upstream side, thereby manufacturing a cellulose acylate film having a residual solvent amount of less than 1%.

The residual solvent amount in the film formed on the support is expressed by the following expression.

(Residual solvent amount)=[(Mass of residual volatile component)/(Mass of film after treat treatment)]× 100%

The mass of the residual volatile component is a value obtained by, when the film is heat treated at 115° C. for one hour, subtracting the mass of the film after the heat treatment from the mass of the film before the heat treatment.

Subsequently, the obtained film was stretched (laterally stretched) in a width direction to a stretch ratio of 25% at a stretch rate of 30%/min using a tenter under a condition at 180° C. The finished cellulose acylate film had a thickness of 60 μm. This film is designated as a film 201.

Cellulose acetate films 202 to 204 were prepared in the same manner as in the preparation of the film 201, except for changing the polycondensed ester or low-molecular weight plasticizer as shown in the following Table 4.

(Measurement of Retardation)

Re and Rth were measured at a measurement wavelength of 590 nm and at 25° C. and 60% RH by an automatic birefringence measuring device (KOBRA 21ADH, manufactured by Oji Scientific Instruments) according to the foregoing method. The measurement results are shown in Table 4.

(MLC6608, manufactured by Merck), followed by sealing to form a liquid crystal layer between the substrates. A retardation of the liquid crystal layer (namely, the product Δn·d of a thickness d (μm) of the liquid crystal layer and a refractive index anisotropy (Δn)) was regulated at 300 nm. The liquid crystal material was aligned so as to be vertically aligned.

(Mounting on VA Panel)

A polarizing plate provided with the foregoing cellulose acylate film 201 on each of an upper side polarizing plate and a lower side polarizing plate (backlight side) of a liquid crystal display device using the foregoing vertical alignment type liquid crystal cell was placed such that the cellulose acylate

TABLE 4

| Sample (Cellulose acylate film) | Plasticizer or polycondensate*[1] | Polycondensate | | | | | | |
|---|---|---|---|---|---|---|---|---|
| | | Ratio of aromatic dicarboxylic acid (% by mole) | Average carbon atom number of aliphatic diol | Both terminals | Number average molecular weight | Re (nm) | Rth (nm) | Area defects |
| 201 | P-15 (12) | 20 | 2.0 | Acetyl ester residue structure | 1,000 | 57 | 128 | A |
| 202 | P-8 (12) | 5 | 2.0 | Acetyl ester residue structure | 1,000 | 51 | 115 | A |
| 203 | Triphenyl phosphate (6.0)/ Biphenyl diphenyl phosphate (4.0) | | | | | 55 | 122 | D |
| 204 | P-33 (11) | 50 | 2.0 | Acetyl ester residue structure | 750 | 56 | 127 | A |

*[1]The numerical value within the parenthesis is the addition amount (parts by mass) based on 100 parts by mass of the cellulose acylate.

In the case of using the conventional low-molecular weight plasticizer, though Re and Rth can be adjusted at preferred values, the loss on heating was large so that the cellulose acylate film was insufficient in view of the area defects (see the sample 203).

In accordance with the polycondensed ester according to the invention, it is possible to obtain a cellulose acetate film having high Re and Rth and suitable for the retardation film without impairing the yield due to the area defects.

Example 3

Mounting Experiment on Liquid Crystal Displace Device of VA Mode

Each of the cellulose acetate film 201 and a commercially available cellulose triacylate film (FUJI TACK TD80UF, manufactured by Fujifilm Corporation) was subjected to the same saponification treatment as in Example 1. Furthermore, the polarizer prepared in Example 1 was sandwiched by the two films using a polyvinyl alcohol based adhesive and dried at 70° C. for 10 minutes or more.

A transmission axis of the polarizer and a slow axis of the above-prepared cellulose acylate film were disposed parallel to each other. The transmission axis of the polarizer and a slow axis of the commercially available cellulose triacylate film were disposed orthogonal to each other.

(Preparation of Liquid Crystal Cell)

A liquid crystal cell was prepared by regulating a cell gap between substrates at 3.6 μm and pouring dropwise a liquid crystal material with negative dielectric anisotropy film 201 faced the liquid crystal cell side. The upper side polarizing plate and the lower side polarizing plate were stuck onto the liquid crystal cell via a pressure sensitive adhesive. The upper side polarizing plate and the lower side polarizing plate were disposed under a crossed Nicols such that the transmission axis of the upper side polarizing plate was disposed in a vertical direction, whereas the transmission axis of the lower side polarizing plate was disposed in a horizontal direction.

A rectangular wave voltage of 55 Hz was applied to the liquid crystal cell. A normally-black mode with a white display of 5 V and a black display of 0 V was employed. A transmittance (%) of black display in a viewing angle in a direction at an azimuth angle of black display of 45 degrees and a polar angle of 60 degrees and a color deviation between a spot at an azimuth angle of 45 degrees and a polar angle 60 degrees and a spot at an azimuth angle of 180 degrees and a polar angle of 60 degrees were determined.

Also, a transmittance ratio (white display/black display) was taken as a contrast ratio, and a viewing angle (a polar angle range where no grayscale inversion took place on the black side at a contrast ratio of 10 or more) was measured on eight grades of from black display (L1) to white display (L8).

As a result of the observation of the prepared liquid crystal display device, a liquid crystal panel using the film of the invention could realize neutral black display in any of the front direction and the viewing angle direction.

Also, the viewing angle (a polar angle range where no grayscale inversion took place on the black side at a contrast ratio of 10 or more) was 80 degrees or more in the vertical and horizontal directions, and the color deviation at the time of black display was less than 0.02. Thus, there were obtained good results.

Example 4

(Mounting Experiment on Monitor of TN Mode)
(Preparation of Cellulose Acylate Film 401)

In the cellulose acetate film 123 of Example 1, fabrication was carried out such that in addition to the polycondensate P-34 of the invention, the amount of the following compound (C) was 2.0% by mass based on 100 parts by mass of the cellulose acylate. At that time, the casting die and various conditions were adjusted such that the thickness was 80 μm. The obtained cellulose acylate film having a residual solvent amount of less than 0.2% was designated as a sample 401.

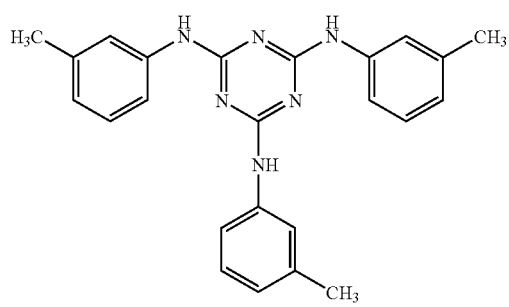

(C)

A retardation of the cellulose acylate film sample 401 was measured by the foregoing method. As a result, Rth was found to be 90 nm.

(Saponification Treatment)

A solution having the following composition was coated in an amount of 5.2 mL/m² on the above-prepared cellulose acetate film 401 and dried at 60° C. for 10 seconds. The surface of the film was washed with running water for 10 seconds, and air at 25° C. was blown to dry the film surface.

| <Composition of saponification solution> | |
|---|---|
| Isopropyl alcohol: | 818 parts by mass |
| Water: | 167 parts by mass |
| Propylene glycol: | 187 parts by mass |
| Potassium hydroxide: | 80 parts by mass |

(Formation of Aligned Film)

A coating solution having the following composition was coated in an amount of 24 mL/m² on the band surface side of the saponified cellulose acetate film 401 by using a #14 wire bar coater and dried by warm air at 60° C. for 60 seconds and further by warm air at 90° C. for 150 seconds. There was thus formed an aligned film.

Subsequently, the aligned film formed in a direction of 45 degrees against the stretching direction (coincident to the slow axis) of the cellulose acetate film 401 was subjected to a rubbing treatment.

| <Composition of coating solution for aligned film> | |
|---|---|
| Modified polyvinyl alcohol (D) having the following structure: | 20 parts by mass |
| Water: | 360 parts by mass |
| Methanol: | 120 parts by mass |
| Glutaraldehyde: | 1.0 part by mass |

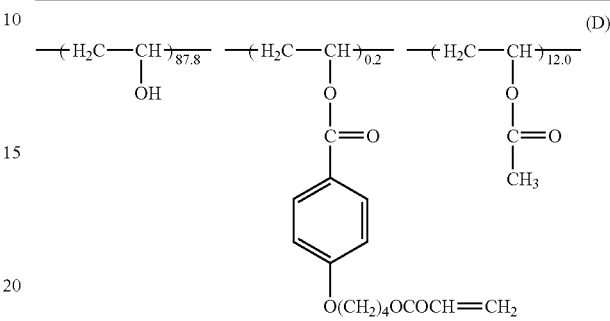

(D)

(Formation of Optically Anisotropic Layer and Preparation of Retardation Film)

A coating solution having 91 parts by mass of the following discotic liquid crystalline compound (E), 9 parts by mass of ethylene oxide-modified trimethylolpropane triacrylate (V #360, manufactured by Osaka Organic Chemical Industry Ltd.), 1.5 parts by mass of cellulose acetate butyrate (CAB531-1, manufactured by Eastman Chemical Company), 3 parts by mass of a photopolymerization initiator (IRGACURE 907, manufactured by Ciba-Geigy AG) and 1 part by mass of a sensitizer (KAYACURE DETX, manufactured by Nippon Kayaku Co., Ltd.) dissolved in 214.2 parts by mass of methyl ethyl ketone was coated in an amount of 5.2 mL/m² on the foregoing aligned film by using a #3 wire bar coater. This was stuck onto a metal frame and heated in a thermostat at 130° C. for 2 minutes, thereby aligning the discotic liquid crystalline compound (E). Subsequently, the discotic liquid crystalline compound (E) was polymerized at 90° C. upon irradiation with UV rays for one minute using a 120 W/cm high mercury vapor pressure lamp. Thereafter, the polymer was allowed to stand for cooling. Thus, not only an optically anisotropic layer was formed, but a stacked retardation film 401 was prepared.

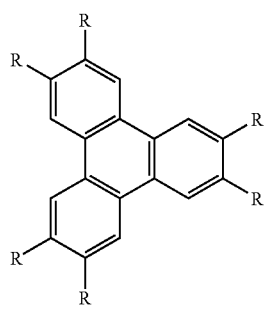

(E)

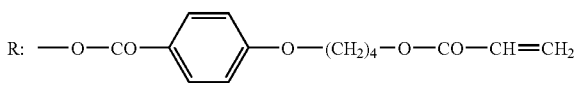

<<Preparation of Polarizing Plate>>

This stacked retardation film 401 was subjected to an alkali treatment with a 2.5 N sodium hydroxide aqueous solution at 40° C. for 60 seconds and washed with water for 3 minutes, thereby forming a saponified layer. There was thus obtained an alkali treated film.

Subsequently, the foregoing alkali treated stacked retardation film 401 was stuck onto one side of the polarizer in the same manner as in Example 1, and a cellulose triacetate film (FUJI TACK, manufactured by Fujifilm Corporation) having a thickness of 40 μm was similarly subjected to an alkali treatment and stuck onto the opposite side of the polarizer, thereby preparing a polarizing plate sample 401.

<Evaluation of Viewing Angle>

A polarizing plate of a TFT-TN liquid crystal panel of LA-1529HM Model, manufactured by NEC Corporation was stripped, and an optically compensatory film placed between the polarizing plate and the liquid crystal panel was stripped. The above-prepared polarizing plate sample 401 was placed and stuck such that the retardation film side was disposed between the polarizer and the liquid crystal panel. Sticking of this polarizing plate was carried out on both of the backlight side relative to the liquid crystal panel and the observation surface side of image, The monitor was driven by a personal computer; a contrast ratio at the time of white/black display was measured using ELDIM's Ez-Contrast; and as to the vertical and horizontal directions, angles from a normal direction of the liquid crystal panel exhibiting a contrast ratio of 10 or more were measured, respectively. As a result, good results with 40 degrees or more were obtained in any of the vertical and horizontal directions.

Example 5

(Preparation of Cellulose Ester Film Sample 501)

| (Preparation of fine particle dispersion D) | |
|---|---|
| AEROSIL 200 (manufactured by Nippon Aerosil Co., Ltd.): | 11 parts by mass |
| Ethanol: | 89 parts by mass |

The foregoing were mixed with stirring for 30 minutes by a dissolver and then dispersed by a Manton-Gaulin.

| (Preparation of fine particle loading solution D) | |
|---|---|
| Cellulose ester D-1: | 4 parts by mass |
| Methylene chloride: | 99 parts by mass |
| Fine particle dispersion D: | 11 parts by mass |

The foregoing were charged in a sealing vessel and heated with stirring to completely dissolve the respective components, and the solution was filtered through an AZUMI FILTER PAPER No. 244, manufactured by Azumi Filter Paper Co., Ltd., thereby preparing a fine particle loading solution D. The foregoing cellulose ester D-1 is cellulose acetate propionate (degree of acetyl group substitution: 1.8, degree of propionyl group substitution: 0.8, number average molecular weight: 54,000 (Mw/Mn=2.9)).

| (Preparation of dope solution D) | |
|---|---|
| Cellulose ester D-1: | 100 parts by mass |
| Polycondensed ester P-34: | 12.0 parts by mass |
| Methylene chloride: | 300 parts by mass |
| Ethanol: | 57 parts by mass |

The foregoing were charged in a sealing vessel and heated with stirring to completely dissolve the respective components. This solution was filtered through an AZUMI FILTER PAPER No. 244, manufactured by Azumi Filter Paper Co., Ltd., thereby preparing a dope solution D.

100 parts by mass of the dope solution D and 2 parts by mass of the fine particle loading solution D were thoroughly mixed by an in-line mixer, and the mixture was uniformly cast in a width of 2,000 mm on a stainless steel band support. The solvent was evaporated by the stainless steel band support to such an extent that the residual solvent amount reached 110%, and the resulting film was peeled away from the stainless steel band support. During peeling, the film was stretched upon applying a tension in an MD stretch ratio of 1.02 times; and subsequently, the both terminals of the film were gripped by the tenter; and the film was stretched in a TD stretch ratio of 1.3 times. At the time of starting stretching, the residual solvent amount was 30%. The film was conveyed in a drying zone at 125° C. while being gripped and then slit in a width of 1,500 mm, thereby obtaining a cellulose ester film sample 501 having a thickness of 40 μm.

(Preparation of Cellulose Ester Film Sample 502)

A cellulose ester film sample 502 was obtained in the same manner as in the preparation of the cellulose ester film sample 501, except that in the fine particle loading solution D and the dope solution D, the cellulose ester D-1 was replaced by a cellulose ester D-2 (cellulose acetate propionate; degree of acetyl group substitution: 1.65, degree of propionyl group substitution: 0.9, number average molecular weight: 54,000 (Mw/Mn=2.9)) and that in the dope solution D, the polycondensed ester P-34 was replaced by P-36.

(Preparation of Cellulose Ester Film Sample 503)

A cellulose ester film sample 503 was obtained in the same manner as in the preparation of the cellulose ester film sample 501, except that in the fine particle loading solution D and the dope solution D, the cellulose ester D-1 was replaced by a cellulose ester D-3 (cellulose acetate propionate; degree of acetyl group substitution: 1.45, degree of propionyl group substitution: 1.1, number average molecular weight: 54,000 (Mw/Mn=2.9)) and that in the dope solution D, the polycondensed ester P-34 was replaced by P-3.

The obtained cellulose ester film samples 501 to 503 were evaluated with respect to the area defects and optical characteristics (Re and Rth) in the same manner as in Example 2. As a result, good results were obtained as shown in the following Table 5.

TABLE 5

| Sample (Cellulose acylate film) | Cellulose acylate | | | Polycondensate | | | | | Area defects | Re (nm) | Rth (nm) |
|---|---|---|---|---|---|---|---|---|---|---|---|
| | Degree of propionyl substitution | Degree of acetyl substitution | Degree of acyl substitution (Total) | *1) | Ratio of aromatic dicarboxylic acid (% by mole) | Average carbon atom number of aliphatic diol | Both terminals | Number average molecular weight | | | |
| 501 | 0.8 | 1.7 | 2.50 | P-34 (12) | 50 | 2.0 | Acetyl ester residue structure | 800 | B | 56 | 118 |
| 502 | 0.9 | 1.65 | 2.55 | P-36 (12) | 50 | 2.0 | Acetyl ester residue structure | 800 | B | 55 | 112 |
| 503 | 1.1 | 1.45 | 2.55 | P-3 (12) | 50 | 2.0 | Acetyl ester residue structure | 1,000 | B | 54 | 110 |

*1) The numerical value within the parenthesis is the addition amount (parts by mass) based on 100 parts by mass of the cellulose acylate.

Example 6

(Preparation of Cellulose Ester Film Sample 601)

A cellulose ester film sample 601 was prepared in the same manner as in the preparation of the cellulose ester film sample 501 of Example 5, except that the cellulose ester D-1 was replaced by a cellulose acylate having a degree of acetyl substitution of 2.42 and that the polycondensate P-34 was replaced by P-33 in an amount of 20 parts by mass based on 100 parts by mass of the cellulose acylate.

(Preparation of Cellulose Ester Film Sample 602)

A cellulose ester film sample 602 was prepared in the same manner as in the preparation of the cellulose ester film sample 601, except that the polycondensed ester P-33 was replaced by P-38 and that the amount of each of the compounds (A) and (B) of Example 2 was adjusted at 1.5 parts by mass based on 100 parts by mass of the cellulose acylate.

The obtained cellulose ester film samples 601 and 602 were evaluated with respect to the area defects and optical characteristics (Re and Rth) in the same manner as in Example 2. As a result, good results were obtained as shown in the following Table 6.

TABLE 6

| Sample (Cellulose acylate film) | Polycondensate | | | | | Area defects | Re (nm) | Rth (nm) |
|---|---|---|---|---|---|---|---|---|
| | *1) | Ratio of aromatic dicarboxylic acid (% by mole) | Average carbon atom number of aliphatic diol | Both terminals | Number average molecular weight | | | |
| 601 | P-33 (20) | 50 | 2.0 | Acetyl ester residue structure | 750 | B | 53 | 108 |
| 602 | P-38 (20) | 50 | 2.50 | Acetyl ester residue structure | 750 | B | 55 | 118 |

*1) The numerical value within the parenthesis is the addition amount (parts by mass) based on 100 parts by mass of the cellulose acylate.

According to the invention, it is possible to provide excellent cellulose ester film, retardation film and polarizing plate, each having low process contamination at the time of manufacture and high production efficiency and having satisfactory surface properties and also capable of controlling an Re value and an Rth value to desired values. Also, it is possible to provide a liquid crystal display device with satisfactory display quality using the foregoing film or polarizing plate.

The entire disclosure of each and every foreign patent application from which the benefit of foreign priority has been claimed in the present application is incorporated herein by reference, as if fully set forth.

What is claimed is:

1. A cellulose ester film comprising:
   a polycondensed ester which is obtained from a mixture containing an aromatic dicarboxylic acid, an aliphatic dicarboxylic acid, an aliphatic diol having an average carbon atom number of from 2.0 to 3.0 and a monocarboxylic acid, and both terminals of which are an aliphatic monocarboxylic acid ester derivative.

2. The cellulose ester film according to claim 1, wherein the polycondensed ester has a number average molecular weight of from 700 to 2,000.

3. The cellulose ester film according to claim 1, wherein the cellulose ester film is stretched in a stretch ratio of from 5% to 100% in a direction vertical to a conveyance direction.

4. The cellulose ester film according to claim 3, wherein the stretching is carried out under a condition that a residual solvent amount of the cellulose ester film is not more than 5%,
   wherein the residual solvent amount is defined as follows:

(Residual solvent amount)=[(Mass of residual volatile component)/(Mass of film after heat treatment)]× 100%.

5. The cellulose ester film according to claim 1, comprising:
a compound having at least two aromatic rings.

6. The cellulose ester film according to claim 1, comprising:
a cellulose acylate which has a degree of acyl substitution of from 2.00 to 2.95 and a viscosity average degree of polymerization of from 180 to 700.

7. A retardation film comprising:
the cellulose ester film according to claim 1.

8. A polarizing plate comprising:
a polarizer; and
protective films on both sides of the polarizer,
wherein at least one of the protective films is the cellulose ester film according to claim 1.

9. A liquid crystal display device comprising:
a liquid crystal cell; and
polarizing plates on both sides of the liquid crystal cell,
wherein at least one of the polarizing plates is the polarizing plate according to claim 8.

* * * * *